United States Patent
Kung et al.

(10) Patent No.: US 11,418,249 B2
(45) Date of Patent: Aug. 16, 2022

(54) METHOD AND APPARATUS FOR HANDLING BEAM FAILURE RECOVERY REGARDING CELL DEACTIVATION IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/111,797

(22) Filed: Dec. 4, 2020

(65) Prior Publication Data

US 2021/0175955 A1 Jun. 10, 2021

Related U.S. Application Data

(60) Provisional application No. 62/944,572, filed on Dec. 6, 2019.

(51) Int. Cl.
*H04W 4/00* (2018.01)
*H04B 7/06* (2006.01)
*H04W 76/19* (2018.01)
*H04W 72/12* (2009.01)
*H04W 80/02* (2009.01)

(52) U.S. Cl.
CPC ...... *H04B 7/0695* (2013.01); *H04W 72/1263* (2013.01); *H04W 76/19* (2018.02); *H04W 80/02* (2013.01)

(58) Field of Classification Search
CPC . H04W 76/19; H04W 74/0833; H04W 24/10; H04W 72/14; H04W 76/27; H04W 72/1284; H04W 36/305; H04W 72/0413; H04W 36/0079
See application file for complete search history.

(56) References Cited

U.S. PATENT DOCUMENTS

| 2019/0281480 A1* | 9/2019 | Wei ............... H04W 24/08 |
| 2020/0350972 A1* | 11/2020 | Yi ............... H04B 7/0695 |
| 2020/0350973 A1* | 11/2020 | Cirik ............... H04B 7/0695 |
| 2020/0383167 A1* | 12/2020 | Sengupta ........... H04W 72/042 |
| 2021/0051754 A1* | 2/2021 | Zhou ............... H04B 7/088 |

FOREIGN PATENT DOCUMENTS

| CN | 110035556 A | 7/2019 |
| EP | 3525516 A1 | 8/2019 |
| WO | 2020028792 A1 | 2/2020 |

OTHER PUBLICATIONS

Corresponding European Patent Application No. 20211744.6, Extended European Search Report dated Apr. 30, 2021.
(Continued)

*Primary Examiner* — Khalid W Shaheed
(74) *Attorney, Agent, or Firm* — Cooper Legal Group LLC

(57) ABSTRACT

A method and apparatus are disclosed. In an example from the perspective of a User Equipment (UE), the UE triggers a first beam failure recovery (BFR) associated with a first cell. In response to the first triggered BFR, the UE triggers a Scheduling Request (SR) for Secondary Cell (SCell) beam failure recovery. In response to deactivation of the first cell, the UE cancels the first triggered BFR and the triggered SR for SCell beam failure recovery associated with the first cell.

20 Claims, 13 Drawing Sheets

(56) References Cited

OTHER PUBLICATIONS

Nokia, Nokia Shanghai Bell, "Summary of [107bis#61][NR eMIMO] Scell BFR MAC CR (Nokia, Samsung)", 3GPP TSG-RAN WG2 Meeting #108, R2-1915331, Oct. 14-18, 2019, Agenda Item 6.16.4, Document for Discussion and Decision, WID/SID NR_eMIMO-Core-Release 16, Reno, Nevada, USA.

Nokia, Nokia Shanghai Bell, "Remaining Details of SCell BFR", 3GPP TSG-RAN WG2 Meeting #108, R2-1915332, Nov. 18-22, 2019, Agenda Item 6.16.4, Document for Discussion and Decision, WID/SID NR_eMIMO-Core-Release 16, Reno, Nevada, USA.

Apple Inc., "Feature Lead Summary on SCell BFR and L1-SINR", 3GPP TSG RAN WG1 #99, R1-1913372, Nov. 18-22, 2019, Agenda Item 7.2.8.3, Document for Discussion/Decision, Reno, USA.

\* cited by examiner

METHOD AND APPARATUS FOR HANDLING BEAM FAILURE RECOVERY REGARDING CELL DEACTIVATION IN A WIRELESS COMMUNICATION SYSTEM

CROSS-REFERENCE TO RELATED APPLICATIONS

The present Application claims the benefit of U.S. Provisional Patent Application Ser. No. 62/944,572 filed on Dec. 6, 2019, the entire disclosure of which is incorporated herein in its entirety by reference.

FIELD

This disclosure generally relates to wireless communication networks, and more particularly, to a method and apparatus for handling beam failure recovery regarding cell deactivation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE triggers a first beam failure recovery (BFR) associated with a first cell. In response to the first triggered BFR, the UE triggers a Scheduling Request (SR) for Secondary Cell (SCell) beam failure recovery. In response to deactivation of the first cell, the UE cancels the first triggered BFR and the triggered SR for SCell beam failure recovery associated with the first cell.

In an example from the perspective of a UE, the UE triggers a first BFR associated with a first cell. In response to the first triggered BFR, the UE triggers a SR for SCell beam failure recovery. In response to deactivation of the first cell, the UE cancels the first triggered BFR and one of stops SR transmission for SCell beam failure recovery if the UE does not have an activated cell associated with a second triggered BFR, or does not stop the SR transmission for SCell beam failure recovery if the UE has an activated cell associated with the second triggered BFR.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321, V15.7.0, Medium Access Control (MAC) protocol specification; R2-1915254, MAC Running CR for NR eMIMO, Samsung; R1-1909833, Reply LS on MAC CE design for SCell BFR, Apple; 3GPP RAN2#108 meeting report; 3GPP RAN2#107bis meeting report. The standards and documents listed above are hereby expressly incorporated by reference in their entirety.

Figure 1:
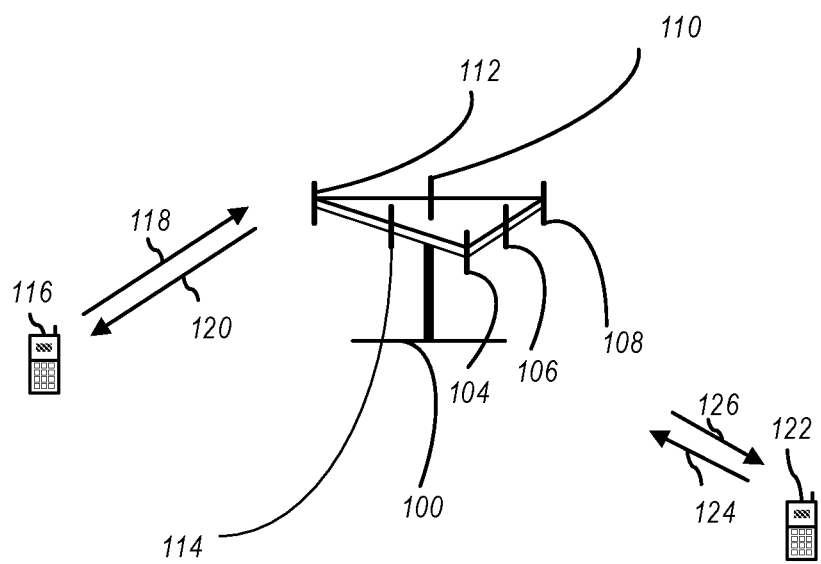
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
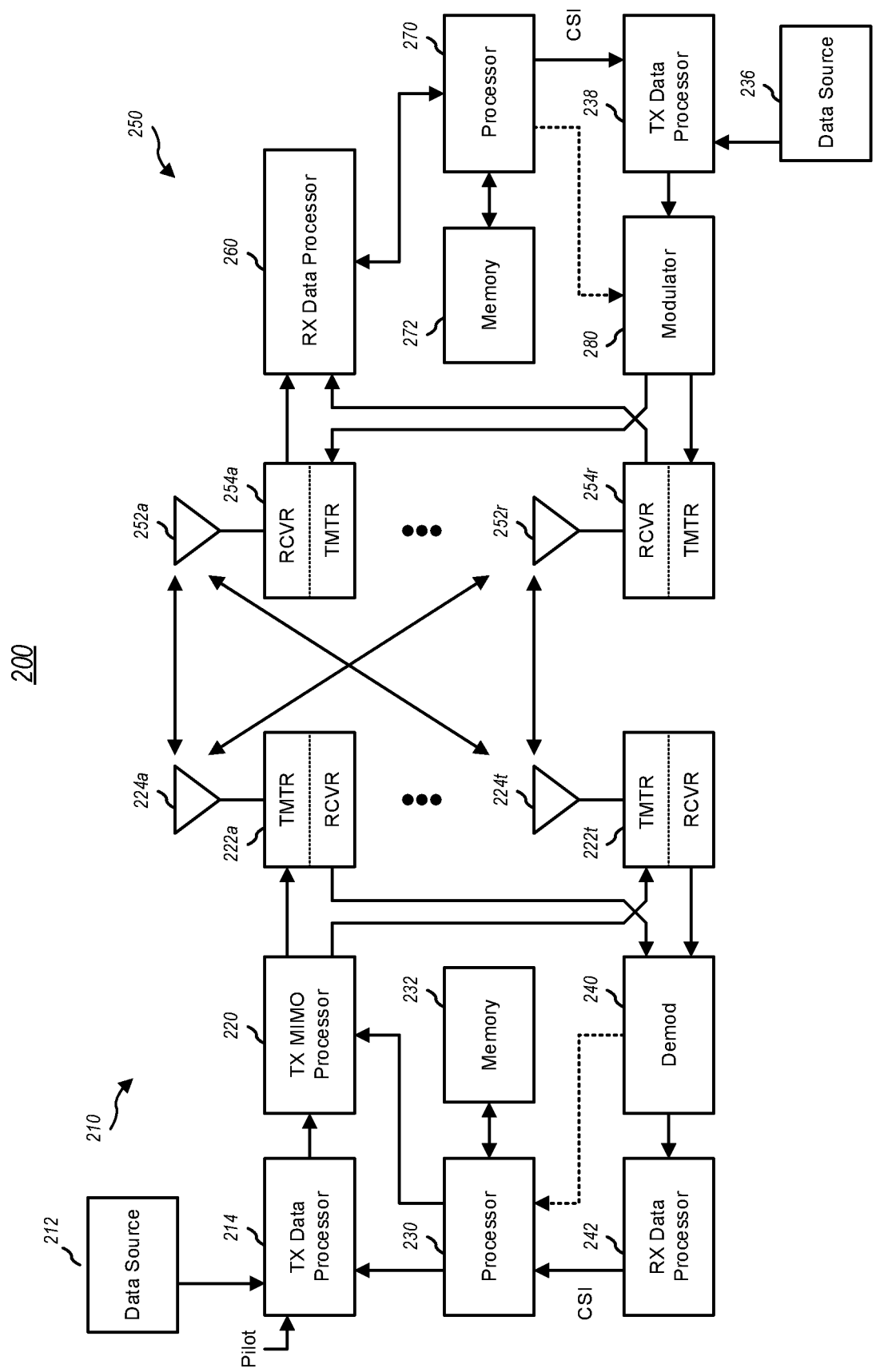
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
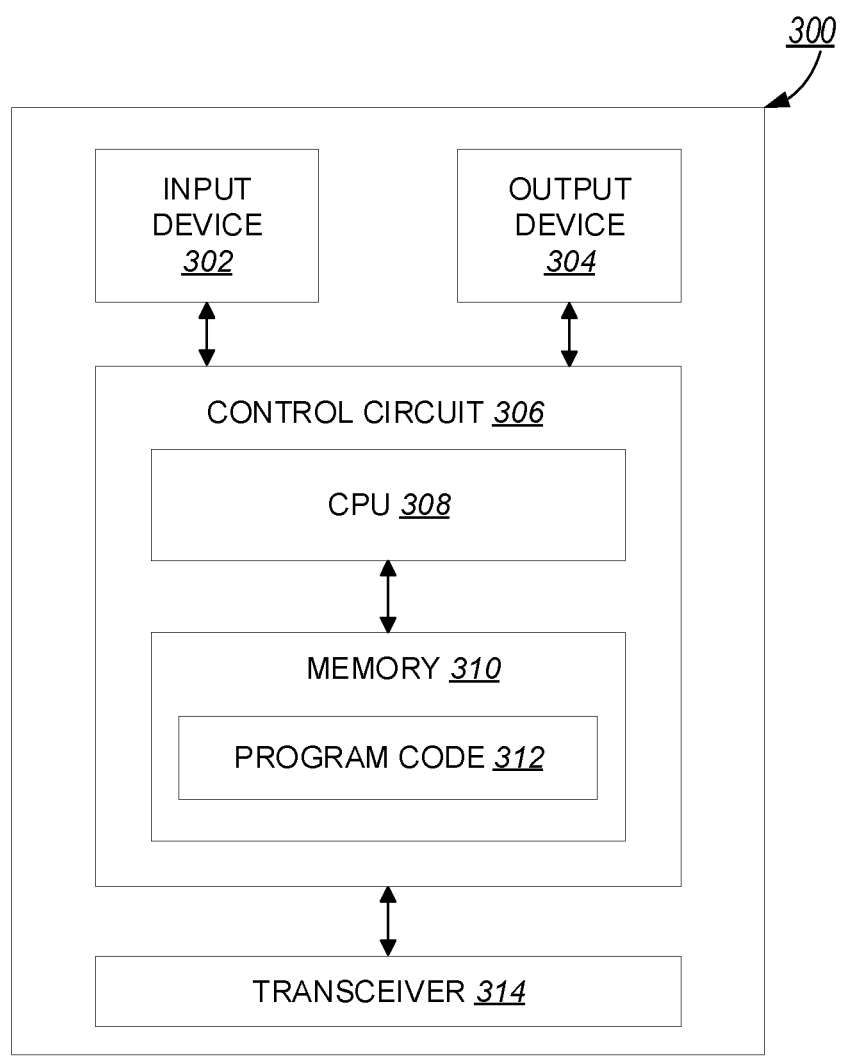
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
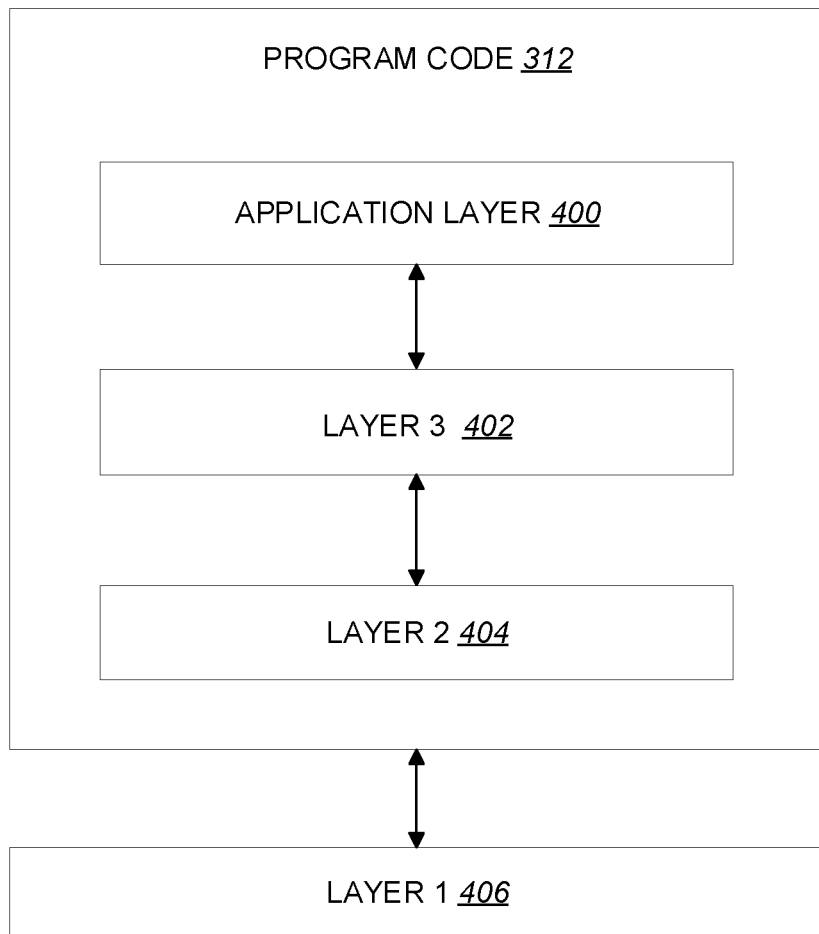
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Uplink (UL) data transfer is introduced in 3GPP TS 38.321, V15.7.0:

5.4 UL-SCH Data Transfer 5.4.1 UL Grant Reception

Uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1>if an uplink grant for this Serving Cell has been received on the PDCCH for the MAC entity's C-RNTI or Temporary C-RNTI; or 1>if an uplink grant has been received in a Random Access Response:

2>if the uplink grant is for MAC entity's C-RNTI and if the previous uplink grant delivered to the HARQ entity for the same HARQ process was either an uplink grant received for the MAC entity's CS-RNTI or a configured uplink grant:

3>consider the NDI to have been toggled for the corresponding HARQ process regardless of the value of the NDI.

2>if the uplink grant is for MAC entity's C-RNTI, and the identified HARQ process is configured for a configured uplink grant:

3>start or restart the configuredGrantTimer for the corresponding HARQ process, if configured.

2>deliver the uplink grant and the associated HARQ information to the HARQ entity.

1>else if an uplink grant for this PDCCH occasion has been received for this Serving Cell on the PDCCH for the MAC entity's CS-RNTI:

2>if the NDI in the received HARQ information is 1:

3>consider the NDI for the corresponding HARQ process not to have been toggled;

3>start or restart the configuredGrantTimer for the corresponding HARQ process, if configured;

3>deliver the uplink grant and the associated HARQ information to the HARQ entity.

2>else if the NDI in the received HARQ information is 0:

3>if PDCCH contents indicate configured grant Type 2 deactivation:

4>trigger configured uplink grant confirmation.

3>else if PDCCH contents indicate configured grant Type 2 activation:

4>trigger configured uplink grant confirmation;

4>store the uplink grant for this Serving Cell and the associated HARQ information as configured uplink grant;

4>initialise or re-initialise the configured uplink grant for this Serving Cell to start in the associated PUSCH duration and to recur according to rules in clause 5.8.2;

4>stop the configuredGrantTimer for the corresponding HARQ process, if running;

For each Serving Cell and each configured uplink grant, if configured and activated, the MAC entity shall:

1>if the PUSCH duration of the configured uplink grant does not overlap with the PUSCH duration of an uplink grant received on the PDCCH or in a Random Access Response for this Serving Cell:

2>set the HARQ Process ID to the HARQ Process ID associated with this PUSCH duration;

2>if the configuredGrantTimer for the corresponding HARQ process is not running:

3>consider the NDI bit for the corresponding HARQ process to have been toggled;

3>deliver the configured uplink grant and the associated HARQ information to the HARQ entity.

For configured uplink grants, the HARQ Process ID associated with the first symbol of a UL transmission is derived from the following equation:

$$\text{HARQ Process ID} = [\text{floor}(\text{CURRENT\_symbol}/\text{periodicity})] \bmod \text{nrofHARQ-Processes}$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

5.4.2 HARQ Operation 5.4.2.1 HARQ Entity

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response, HARQ process identifier 0 is used.

When the MAC entity is configured with pusch-AggregationFactor>1, the parameter pusch-AggregationFactor provides the number of transmissions of a TB within a bundle of the dynamic grant. After the initial transmission, pusch-AggregationFactor—1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].

For each uplink grant, the HARQ entity shall:
1>identify the HARQ process associated with this grant, and for each identified HARQ process:
2>if the received grant was not addressed to a Temporary C-RNTI on PDCCH, and the NDI provided in the associated HARQ information has been toggled compared to the value in the previous transmission of this TB of this HARQ process; or
2>if the uplink grant was received on PDCCH for the C-RNTI and the HARQ buffer of the identified process is empty; or
2>if the uplink grant was received in a Random Access Response; or
2>if the uplink grant was received on PDCCH for the C-RNTI in ra-Response Window and this PDCCH successfully completed the Random Access procedure initiated for beam failure recovery; or
2>if the uplink grant is part of a bundle of the configured uplink grant, and may be used for initial transmission according to clause 6.1.2.3 of TS 38.214 [7], and if no MAC PDU has been obtained for this bundle:
3>if there is a MAC PDU in the Msg3 buffer and the uplink grant was received in a Random Access Response; or:
3>if there is a MAC PDU in the Msg3 buffer and the uplink grant was received on PDCCH for the C-RNTI in ra-ResponseWindow and this PDCCH successfully completed the Random Access procedure initiated for beam failure recovery:
4>obtain the MAC PDU to transmit from the Msg3 buffer.
4>if the uplink grant size does not match with size of the obtained MAC PDU; and
4>if the Random Access procedure was successfully completed upon receiving the uplink grant:
5>indicate to the Multiplexing and assembly entity to include MAC subPDU(s) carrying MAC SDU from the obtained MAC PDU in the subsequent uplink transmission;
5>obtain the MAC PDU to transmit from the Multiplexing and assembly entity.
3>else:
4>obtain the MAC PDU to transmit from the Multiplexing and assembly entity, if any;
3>if a MAC PDU to transmit has been obtained:
4>deliver the MAC PDU and the uplink grant and the HARQ information of the TB to the identified HARQ process;
4>instruct the identified HARQ process to trigger a new transmission;
4>if the uplink grant is addressed to CS-RNTI; or
4>if the uplink grant is a configured uplink grant; or
4>if the uplink grant is addressed to C-RNTI, and the identified HARQ process is configured for a configured uplink grant:
5>start or restart the configuredGrantTimer, if configured, for the corresponding HARQ process when the transmission is performed.
3>else:
4>flush the HARQ buffer of the identified HARQ process.
2>else (i.e. retransmission):
3>if the uplink grant received on PDCCH was addressed to CS-RNTI and if the HARQ buffer of the identified process is empty; or
3>if the uplink grant is part of a bundle and if no MAC PDU has been obtained for this bundle; or
3>if the uplink grant is part of a bundle of the configured uplink grant, and the PUSCH duration of the uplink grant overlaps with a PUSCH duration of another uplink grant received on the PDCCH or in a Random Access Response for this Serving Cell:
4>ignore the uplink grant.
3>else:
4>deliver the uplink grant and the HARQ information (redundancy version) of the TB to the identified HARQ process;
4>instruct the identified HARQ process to trigger a retransmission;
4>if the uplink grant is addressed to CS-RNTI; or
4>if the uplink grant is addressed to C-RNTI, and the identified HARQ process is configured for a configured uplink grant:
5>start or restart the configuredGrantTimer, if configured, for the corresponding HARQ process when the transmission is performed.

When determining if NDI has been toggled compared to the value in the previous transmission the MAC entity shall ignore NDI received in all uplink grants on PDCCH for its Temporary C-RNTI.

5.4.2.2 HARQ Process

Each HARQ process is associated with a HARQ buffer.

New transmissions are performed on the resource and with the MCS indicated on either PDCCH, Random Access Response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:
1>store the MAC PDU in the associated HARQ buffer;
1>store the uplink grant received from the HARQ entity;
1>generate a transmission as described below.

If the HARQ entity requests a retransmission for a TB, the HARQ process shall:
1>store the uplink grant received from the HARQ entity;
1>generate a transmission as described below.

To generate a transmission for a TB, the HARQ process shall:
1>if the MAC PDU was obtained from the Msg3 buffer; or
1>if there is no measurement gap at the time of the transmission and, in case of retransmission, the retransmission does not collide with a transmission for a MAC PDU obtained from the Msg3 buffer:
2>instruct the physical layer to generate a transmission according to the stored uplink grant.

Scheduling Request (SR) is introduced in 3GPP TS 38.321, V15.7.0:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (clause 5.4.5) (if such a configuration exists) is considered as corresponding SR configuration for the triggered SR.

RRC configures the following parameters for the scheduling request procedure:
sr-ProhibitTimer (per SR configuration);
sr-TransMax (per SR configuration).

The following UE variables are used for the scheduling request procedure:
SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see clause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:
1>if the MAC entity has no valid PUCCH resource configured for the pending SR:
  2>initiate a Random Access procedure (see clause 5.1) on the SpCell and cancel the pending SR.
1>else, for the SR configuration corresponding to the pending SR:
  2>when the MAC entity has an SR transmission occasion on the valid PUCCH resource for SR configured; and
  2>if sr-ProhibitTimer is not running at the time of the SR transmission occasion; and
  2>if the PUCCH resource for the SR transmission occasion does not overlap with a measurement gap; and
  2>if the PUCCH resource for the SR transmission occasion does not overlap with a UL-SCH resource:
    3>if SR_COUNTER<sr-TransMax:
      4>increment SR_COUNTER by 1;
      4>instruct the physical layer to signal the SR on one valid PUCCH resource for SR;
      4>start the sr-ProhibitTimer.
    3>else:
      4>notify RRC to release PUCCH for all Serving Cells;
      4>notify RRC to release SRS for all Serving Cells;
      4>clear any configured downlink assignments and uplink grants;
      4>clear any PUSCH resources for semi-persistent CSI reporting;
      4>initiate a Random Access procedure (see clause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see clause 5.4.5) prior to the MAC PDU assembly, or when the UL grant(s) can accommodate all pending data available for transmission.

Activation and deactivation of Secondary Cells (SCells) are introduced in 3GPP TS 38.321, V15.7.0:
5.9 Activation/Deactivation of SCells If the MAC entity is configured with one or more SCells, the network may activate and deactivate the configured SCells. Upon configuration of an SCell, the SCell is deactivated.

The configured SCell(s) is activated and deactivated by:
receiving the SCell Activation/Deactivation MAC CE described in clause 6.1.3.10;
configuring sCellDeactivationTimer timer per configured SCell (except the SCell configured with PUCCH, if any): the associated SCell is deactivated upon its expiry.

The MAC entity shall for each configured SCell:
1>if an SCell Activation/Deactivation MAC CE is received activating the SCell:
  2>activate the SCell according to the timing defined in TS 38.213 [6]; i.e. apply normal SCell operation including:
    3>SRS transmissions on the SCell;
    3>CSI reporting for the SCell;
    3>PDCCH monitoring on the SCell;
    3>PDCCH monitoring for the SCell;
    3>PUCCH transmissions on the SCell, if configured.
  2>if the SCell was deactivated prior to receiving this SCell Activation/Deactivation MAC CE:
    3>activate the DL BWP and UL BWP indicated by firstActiveDownlinkBWP-Id and firstActiveUplinkBWP-Id respectively;
  2>start or restart the sCellDeactivationTimer associated with the SCell according to the timing defined in TS 38.213 [6];
  2>(re-)initialize any suspended configured uplink grants of configured grant Type 1 associated with this SCell according to the stored configuration, if any, and to start in the symbol according to rules in clause 5.8.2;
  2>trigger PHR according to clause 5.4.6.
1>else if an SCell Activation/Deactivation MAC CE is received deactivating the SCell; or
1>if the sCellDeactivationTimer associated with the activated SCell expires:
  2>deactivate the SCell according to the timing defined in TS 38.213 [6];
  2>stop the sCellDeactivationTimer associated with the SCell;
  2>stop the bwp-InactivityTimer associated with the SCell;
  2>deactivate any active BWP associated with the SCell;
  2>clear any configured downlink assignment and any configured uplink grant Type 2 associated with the SCell respectively;
  2>clear any PUSCH resource for semi-persistent CSI reporting associated with the SCell;
  2>suspend any configured uplink grant Type 1 associated with the SCell;
  2>flush all HARQ buffers associated with the SCell.
1>if PDCCH on the activated SCell indicates an uplink grant or downlink assignment; or 1>if PDCCH on the Serving Cell scheduling the activated SCell indicates an uplink grant or a downlink assignment for the activated SCell; or
1>if a MAC PDU is transmitted in a configured uplink grant or received in a configured downlink assignment:
2>restart the sCellDeactivationTimer associated with the SCell.
1>if the SCell is deactivated:
2>not transmit SRS on the SCell;
2>not report CSI for the SCell;
2>not transmit on UL-SCH on the SCell;
2>not transmit on RACH on the SCell;
2>not monitor the PDCCH on the SCell;
2>not monitor the PDCCH for the SCell;
2>not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

In a Change request for 3GPP TS 38.321, procedure for beam failure procedure for a SCell is introduced in R2-1915254:

5.17 Beam Failure Detection and Recovery Procedure

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:
  beamFailureInstanceMaxCount for the beam failure detection;
  beamFailureDetectionTimer for the beam failure detection;
  beamFailureRecoveryTimer for the beam failure recovery procedure;
  rsrp-ThresholdSSB: an RSRP threshold for the beam failure recovery;
  powerRampingStep: powerRampingStep for the beam failure recovery;
  powerRampingStepHighPriority: powerRampingStepHighPriority for the beam failure recovery;
  preambleReceivedTargetPower: preambleReceivedTargetPower for the beam failure recovery;
  preambleTransMax: preambleTransMax for the beam failure recovery;
  scalingFactorBI: scalingFactorBI for the beam failure recovery;
  ssb-perRACH-Occasion: ssb-perRACH-Occasion for the beam failure recovery;
  ra-ResponseWindow: the time window to monitor response(s) for the beam failure recovery using contention-free Random Access Preamble;
  prach-ConfigurationIndex: prach-ConfigurationIndex for the beam failure recovery;
  ra-ssb-OccasionMaskIndex: ra-ssb-OccasionMaskIndex for the beam failure recovery;
  ra-OccasionList: ra-OccasionList for the beam failure recovery.
Editors Note: The specific parameters for SCell BFR will be replicated here after they are settled.

The following UE variables are used for the beam failure detection procedure:
  BFI_COUNTER: counter for beam failure instance indication which is initially set to 0.

The MAC entity shall for each Serving Cell configured for beam failure detection:
1>if beam failure instance indication has been received from lower layers:
  2>start or restart the beamFailureDetectionTimer;
  2>increment BFI_COUNTER by 1;
  2>if BFI_COUNTER>=beamFailureInstanceMaxCount:
    3>if the Serving Cell is SCell:
      4>trigger BFR;
    3>else:
      4>initiate a Random Access procedure (see clause 5.1) on the SpCell.
1>if the beamFailureDetectionTimer expires; or
1>if beamFailureDetectionTimer, beamFailureInstanceMaxCount, or any of the reference signals used for beam failure detection is reconfigured by upper layers associated with this Serving Cell:
  2>set BFI_COUNTER to 0.
1>if the Serving Cell is SpCell and the Random Access procedure is successfully completed (see clause 5.1):
  2>set BFI_COUNTER to 0;
  2>stop the beamFailureRecoveryTimer, if configured;
  2>consider the Beam Failure Recovery procedure successfully completed.
1>else if the Serving Cell is SCell; and
1>if a PDCCH addressed to C-RNTI indicating uplink grant for a new transmission is received for the HARQ process used for the SCell BFR MAC CE transmission indicating this Serving Cell:
  2>set BFI_COUNTER to 0;
  2>consider the Beam Failure Recovery procedure successfully completed and cancel all the triggered BFRs for this Serving Cell.

The MAC entity shall:
1>if the Beam Failure Recovery procedure determines that at least one BFR has been triggered and not cancelled:
  2>if UL-SCH resources are available for a new transmission and the UL-SCH resources can accommodate the SCell BFR MAC CE plus its subheader as a result of logical channel prioritization:
    3>instruct the Multiplexing and Assembly procedure to generate the SCell BFR MAC CE.
  2>else:
    3>trigger a Scheduling Request for SCell beam failure recovery.

6.1.3.XX SCell BFR MAC CE

The SCell BFR MAC CE is identified by a MAC subheader with LCID as specified in Table 6.2.1-2. It has variable size and consists of the following fields:
Editors Note: Exact fields and format are FFS.

When the SCell BFR MAC CE is to be generated, the MAC entity shall for each Serving Cell to be reported in this SCell BFR MAC CE:
1>if at least one of the SSBs with SS-RSRP above [rsrp-ThresholdSSB] amongst the SSBs in [candidateBeamRSList] or the CSI-RSs with CSI-RSRP above [rsrp-ThresholdCSI-RS] amongst the CSI-RSs in [candidateBeamRSList] is available:
  2>select an SSB with SS-RSRP above [rsrp-ThresholdSSB] amongst the SSBs in [candidateBeamRSList] or a CSI-RS with CSI-RSRP above [rsrp-ThresholdCSI-RS] amongst the CSI-RSs in [candidateBeamRSList];

2>set the [new candidate RS field name] to 1 and set the [new candidate RS index field name] corresponding to the selected SSB or CSI-RS in the SCell BFR MAC CE.

1>else:

2>set the [new candidate RS field name] to 0 in the SCell BFR MAC CE.

Editors Note: The highlighted field names will be changed to the ones defined for the purpose.

In 3GPP RAN2#107bis meeting, agreements associated with BFR procedure for SCell have been made, at least some of which are quoted below from 3GPP RAN2#107bis meeting report:

Agreements:

1. The Scell beam failure detection is per cell.
2. Each DL BWP of a SCell can be configured with an independent SCell BFR configuration (the content is FFS)
3. One SR ID is configured for BFR within the same cell group.
4. The SCell BFRQ MAC CE triggers a SCell BFRQ SR if there is no valid uplink grant which can accommodate the SCell BFRQ MAC CE.
5. FFS whether the transmission of the SCell BFRQ MAC CE cancels the pending BFRQ SR of the failed SCell(s).(depends whether the MAC CE provides info for one or more Scells)
6. When the number of the BFRQ SR transmission reaches the sr-TransMax, the UE triggers a RACH procedure (i.e. reuse Rel-15 behaviour)

Discussion of a BFR procedure is quoted below from a document, R1-1909833, associated with a 3GPP RAN1#98 meeting:

Q1: Can the UE transmit BFR MAC CE using UL grant of any serving cell or should there be a restriction not to send it on failed serving cell(s)?

R1: At least from RAN1 perspective, there is no need for introducing such restrictions on MAC CE transmission for BFR in Rel-16.

Q2: If the UE already has the UL grant on serving cell(s) on which BFR MAC CE can be transmitted based on the answer to question 1, is the UE still required to transmit SR-like indication for BFR?

R2: In this case, UE is not required to transmit SR-like indication for SCell BFR.

Q3: Is there a case where the SR-like dedicated PUCCH resource for SCell BFR is not configured? If the SR-like dedicated PUCCH resource is not configured, one possible option being considered by RAN2 is that the UE follows the existing framework for requesting uplink resources when no uplink resources are available (i.e. performs CBRA on SpCell).

R3: RAN1 did not discuss this case. RAN1 plans to conclude on this by RAN1#98bis.

Q4: Is the SR-like dedicated PUCCH resource for SCell BFR configured for each SCell separately or is it common for all SCell(s) of the same cell group (i.e. MCG/SCG)?

R4: The SR-like dedicated PUCCH resource for SCell BFR is not configured separately for each SCell.

Q5: What conditions are used for the (successful) completion of the SCell BFR?

R5: When UE receives beam failure recovery response (BFRR) to step 2, UE can consider BFR procedure is finished, where the BFRR to step 2 is a normal uplink grant to schedule a new transmission for the same HARQ process as PUSCH carrying the step 2 MAC CE, which is the same as normal "ACK" for PUSCH.

In 3GPP RAN2#108 meeting, agreements associated with BFR procedure for SCell have been made, at least some of which are quoted below from 3GPP RAN2#108 meeting report:

Agreements:

1. beamFailureDetectionTimer and beamFailureInstanceMaxCount are configured cell specifically per each DL BWP configured.
2. Upon reconfiguration of beamFailureDetectionTimer, beamFailureInstanceMaxCount, or any of the reference signals used for beam failure detection by upper layers, BFI_COUNTER is set to 0 for the given Serving Cell.
3. When SCell BFR SR resource is not configured and SCell BFR MAC CE transmission triggers SCell BFR SR, Random Access procedure on SpCell is triggered to request UL resources to transmit the SCell BFR MAC CE (similarly to Rel-15 behaviour on SR).
4. when SCell BFR SR is triggered and the UE has an overlapping SR PUCCH resource with the SCell BFR SR PUCCH resource, the UE shall select the SCell BFR SR PUCCH resource for transmission.
5. Pending SR for SCell beam failure recovery triggered prior to the MAC PDU assembly shall be cancelled when the MAC PDU is transmitted and this PDU includes a SCell BFR MAC CE.
6. SCell BFR MAC CE can carry information of multiple failed SCells, ie., multiple entry format for SCell BFR MAC CE is defined.
7. For each SCell, the SCell BFR MAC CE indicates the following information: information about the failed SCell index;
indication if a new candidate beam RS is detected or not;
new candidate beam RS index (if available).
8. SCell BFR MAC CE has higher priority at least than "data from any Logical Channel, except data from UL-CCCH" and LBT MAC CE, higher priority is FFS.

In NR, beam failure recovery (BFR) and BFR procedure for a Secondary cell (SCell) has been introduced. A UE may trigger a BFR (e.g. a trigger for generating a BFR MAC CE (e.g., a SCell BFR MAC CE) or a trigger for triggering a Scheduling Request (SR) for SCell beam failure recovery) in response to receiving one or more beam failure indications (e.g., consecutive beam failure indications) from one or more lower layers (e.g., a physical layer) of the UE. For example, the UE may trigger the BFR in response to receiving consecutive beam failure indications, amounting to a threshold number of beam failure indications, from the one or more lower layers of the UE. The UE may perform a BFR procedure in response to the one or more beam failure indications from the one or more lower layers. In some examples, a BFR procedure for a SCell may comprise transmission of a Scheduling Request (SR) to a base station (e.g., the SR may be transmitted to the base station to request one or more uplink (UL) resources for transmitting a MAC control element (CE)). Alternatively and/or additionally, the BFR procedure may comprise transmission of a MAC CE (e.g., a BFR MAC CE), using a Hybrid Automatic Repeat Request (HARQ) process, to the base station (e.g., the MAC CE may be transmitted during the HARQ process and/or the MAC CE may be transmitted by performing one or more operations of the HARQ process). In some examples, the MAC CE may indicate one or more candidate beams associated with BFR. Alternatively and/or additionally, the MAC CE may indicate one or more SCells associated with a triggered BFR (e.g., the BFR triggered in response to receiving the one or more beam failure indications) and/or the ongoing BFR procedure. The UE may consider the BFR procedure to be finished and/or completed when the base station schedules an UL grant for a transmission (e.g., a new transmission for the same HARQ process used to transmit the MAC CE).

Figure 5:
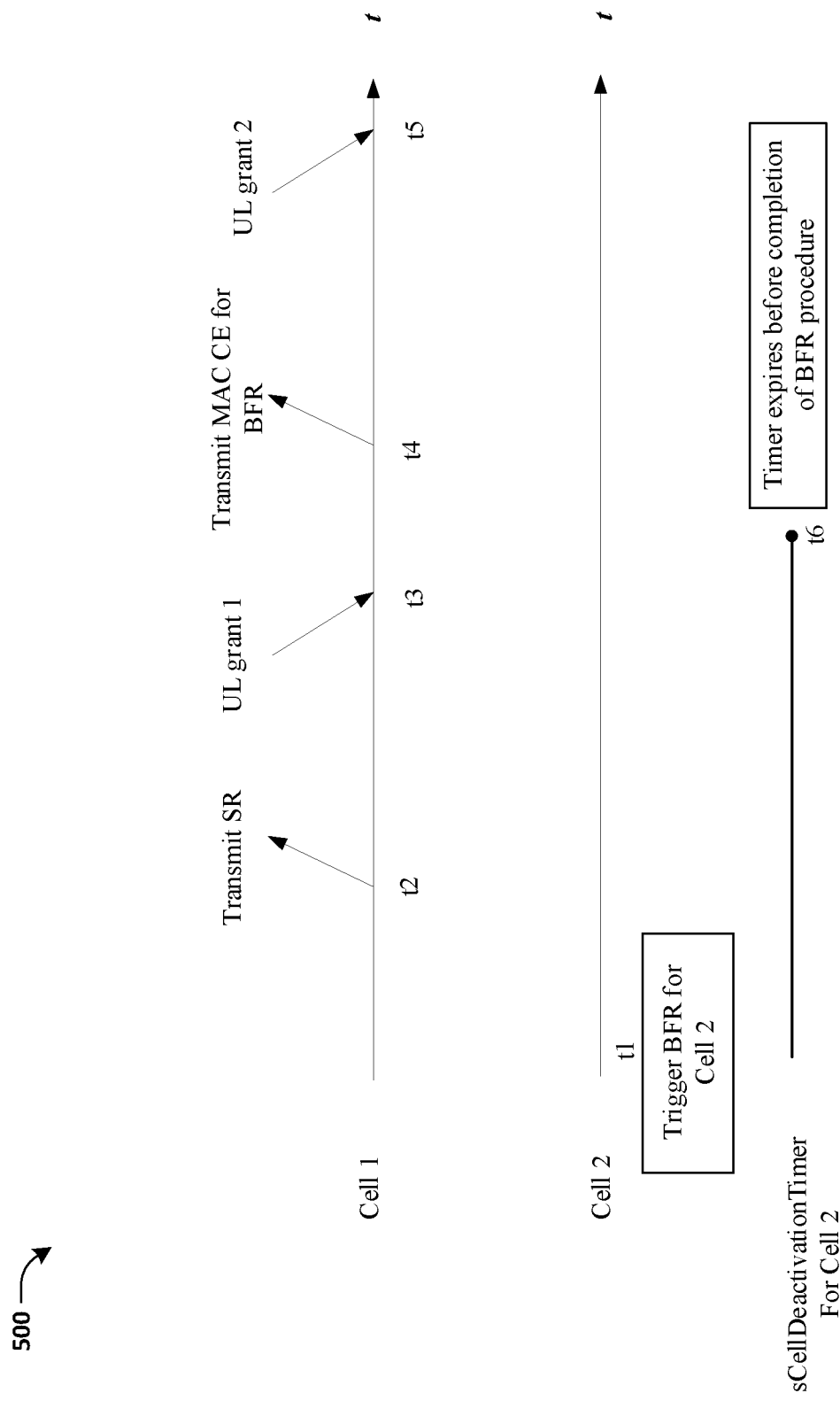
FIG. 5 is a diagram illustrating an exemplary scenario associated with a triggered beam failure recovery (BFR) according to one exemplary embodiment.

An issue, such as illustrated in FIG. 5, may occur when a cell, associated with a triggered BFR (e.g. a trigger for generating a BFR MAC CE (e.g., a SCell BFR MAC CE) or a trigger for triggering a SR for SCell beam failure recovery) and/or an ongoing BFR procedure, is deactivated before the triggered BFR is canceled and/or the ongoing BFR procedure is finished. FIG. 5 illustrates an exemplary scenario 500 associated with a triggered BFR, according to some embodiments. In the exemplary scenario 500, a UE is configured with multiple cells (e.g., two cells), Cell 1 and Cell 2, by a base station. Cell 1 may be a Primary Cell (PCell) or a SCell. Cell 2 may be a SCell. The UE is configured with a timer (e.g., sCellDeactivationTimer) associated with Cell 2 (e.g., the timer is shown as "sCellDeactivationTimer For Cell 2" in FIG. 5). At a timing t1, the UE may trigger BFR associated with Cell 2 (e.g., the UE may trigger BFR associated with Cell 2 in response to one or more beam failure indications from one or more lower layers of the UE). The UE may perform a BFR procedure in response to the triggered BFR (and/or in response to the triggered BFR being triggered by the UE). At a timing t2, the UE transmits a SR in response to the triggered BFR on Cell 1 (e.g., in response to BFR on Cell 1 being triggered by the UE). The UE may be configured with one or more SR resources (e.g., one or more Physical Uplink Control Channel (PUCCH) resources) on Cell 1 (e.g., the one or more SR resources may correspond to one or more resources for transmission of one or more SRs to the base station). In an example, the UE may use the one or more SR resources to transmit the SR to the base station. At a timing t3, in response to the SR, the base station may indicate a first UL grant (shown as "UL grant 1" in FIG. 5), on Cell 1, for new transmission. The UE may receive the first UL grant "UL grant 1" and/or use the first UL grant "UL grant 1" to transmit, at a timing t4, a MAC CE (e.g., a BFR MAC CE) using a HARQ process (e.g., HARQ process 1) indicating information associated with BFR for Cell 2. At a timing t5, the base station may indicate a second UL grant (shown as "UL grant 2" in FIG. 5) for new transmission for the HARQ process (e.g., the HARQ process 1 used to transmit the MAC CE) to finish the BFR procedure. However, at a timing t6, the timer (e.g., sCellDeactivationTimer) may expire before completion of the BFR procedure (e.g., the timer may expire before the completion of the BFR procedure since the UE may not be able to receive downlink (DL) signaling from Cell 2) and/or Cell 2 may be deactivated (e.g., Cell 2 may be deactivated in response to expiration of the timer). The ongoing BFR procedure may incur unnecessary transmission overhead between the UE and the base station since the BFR procedure is for recovery of transmission between Cell 2 and the UE and/or since the BFR procedure may be unnecessary if Cell 2 is deactivated. The transmission of the MAC CE (e.g., the BFR MAC CE) may be outdated and may cause the base station to schedule an unnecessary UL grant (e.g., the second UL grant "UL grant 2"), such as for performance of the BFR procedure. In some examples, if the UE is not configured with a SR configuration for BFR for Cell 2, the UE may trigger a random access procedure in response to the triggered BFR, and the random access procedure may interfere with connection establishment of other UEs to the base station.

To solve the foregoing issues, such as to avoid unnecessarily performing operations of a BFR procedure, the present disclosure provides for one or more techniques, systems and/or operations with respect to Example Embodiment 1 and Example Embodiment 2.

EXAMPLE EMBODIMENT 1

In Example Embodiment 1, a UE may cancel one or more triggered BFRs associated with a cell in response to a deactivation of the cell. For example, the UE may cancel a first triggered BFR associated with a first cell in response to deactivation of the first cell. Alternatively and/or additionally, the UE may stop an ongoing BFR procedure associated with the first cell in response to the deactivation of the first cell. Alternatively and/or additionally, the UE may stop the ongoing BFR procedure associated with the first cell, in response to the deactivation of the first cell, if a BFR MAC CE generated in response to the ongoing BFR procedure comprises beam failure information of only the first cell (and/or if the BFR MAC CE generated in response to the ongoing BFR procedure does not report beam failure of any cell that is activated for the UE).

Alternatively and/or additionally, the UE may stop the ongoing BFR procedure associated with the first cell, in response to the deactivation of the first cell, if the UE does not have one or more other cells (e.g., one or more activated cells) associated with a triggered and/or pending BFR (e.g., a second triggered BFR other than the first triggered BFR). For example, the UE may stop the ongoing BFR procedure associated with the first cell, in response to the deactivation of the first cell, if the UE is not configured with a cell (e.g., any cell) that is activated and is associated with a triggered and/or pending BFR. Alternatively and/or additionally, UE may stop the ongoing BFR procedure (such as in response to deactivation of the first cell) if beam failure information, indicated in a BFR MAC CE generated in response to the ongoing BFR procedure, does not comprise beam failure information of one or more activated cells (e.g., since the first cell is deactivated, the first cell may not be considered when determining whether or not the beam failure information indicated in the BFR MAC CE comprises beam failure information of one or more activated cells). In some examples, the UE may not stop a BFR procedure (such as the ongoing BFR procedure) if there is at least one activated cell (with which the UE is configured) that is associated with a triggered and/or pending BFR. The UE may not stop a BFR procedure (such as the ongoing BFR procedure) if a BFR MAC CE generated in response to the BFR procedure comprises beam failure information of at least one activated cell (that is different than the first cell, for example, since the first cell is deactivated).

The ongoing BFR procedure may comprise transmission of a SR or a SR transmission for BFR (e.g., a SR for SCell beam failure recovery associated with the first triggered BFR). For example, the SR (e.g., the SR for SCell beam failure recovery) may be transmitted to a base station to request one or more UL resources for transmission of a MAC CE (e.g., a BFR MAC CE of the ongoing BFR procedure). The UE may trigger the SR (e.g. a trigger for SR transmission or for initiating a random access procedure) in response to the first triggered BFR (e.g., the UE may trigger and/or transmit the SR in response to the first triggered BFR being triggered). Alternatively and/or additionally, the UE may stop transmission of the SR, in response to deactivation of the first cell, if the UE does not have one or more other cells (e.g., one or more activated cells) associated with a triggered and/or pending BFR (e.g., a second triggered BFR other than the first triggered BFR). For example, the UE may stop transmission of the SR or the SR transmission, in response to the deactivation of the first cell, if the UE is not configured with a cell (e.g., any cell) that is activated and is associated with a triggered and/or pending BFR. The UE may not stop transmission of the SR or the SR transmission (such as in response to deactivation of the first cell) if there is at least one activated cell (with which the UE is configured) associated with a triggered and/or pending BFR (e.g., second triggered BFR other than the first triggered BFR).

In some examples, prior to the UE stopping transmission of the SR or a SR transmission (e.g., the SR triggered in response to the first triggered BFR), the UE may perform one or more transmissions of the SR (e.g., the UE may transmit the SR to a base station one or more times prior to the deactivation of the first cell and/or prior to the UE stopping transmission of the SR or a SR transmission).

In an example, the UE may not stop transmission of a SR or a SR transmission associated with BFR if there is at least one activated cell associated with a triggered BFR (e.g., the UE may not stop transmission of a SR or a SR transmission associated with BFR if at least one cell, with which the UE is configured, is activated and associated with a triggered and/or pending BFR). The UE may stop transmission of a SR or a SR transmission associated with BFR if there are no activated cells associated with a triggered BFR (e.g., the UE may stop transmission of a SR or a SR transmission associated with BFR if there are no cells, with which the UE is configured, that are activated and associated with a triggered and/or pending BFR).

In another example, the UE may not stop transmission of a BFR MAC CE associated with BFR if there is at least one activated cell associated with a triggered BFR (e.g., the UE may not stop transmission of a BFR MAC CE associated with BFR if at least one cell, with which the UE is configured, is activated and associated with a triggered and/or pending BFR). The UE may stop transmission of a BFR MAC CE associated with BFR if there are no activated cells associated with a triggered BFR (e.g., the UE may stop transmission of a BFR MAC CE associated with BFR if there are no cells, with which the UE is configured, that are activated and associated with a triggered and/or pending BFR).

Alternatively and/or additionally, the UE may cancel a triggered SR (e.g. a trigger for SR transmission or a trigger for initiating a random access procedure) for BFR (e.g., SCell beam failure recovery) associated with the first cell in response to the deactivation of the first cell and/or in response to stopping the ongoing BFR procedure.

Alternatively and/or additionally, in response to the deactivation of the first cell and/or in response to stopping the ongoing BFR procedure, the UE may stop a random access procedure initiated in response to a SR or BFR triggered for the first cell (e.g., the UE may stop any ongoing random access procedure that is initiated in response to a SR or BFR triggered for the first cell).

Alternatively and/or additionally, the UE may not transmit a BFR MAC CE that is generated before deactivation of the first cell. The BFR MAC CE may indicate beam failure information of the first cell.

Alternatively and/or additionally, the UE may discard a BFR MAC CE associated with the first triggered BFR (e.g., the UE may discard the BFR MAC CE in response to the deactivation of the first cell). Alternatively and/or additionally, the UE may generate a MAC PDU without the BFR MAC CE (e.g., a MAC PDU that does not comprise the BFR MAC CE). Alternatively and/or additionally, the UE may rebuild a first MAC PDU comprising the BFR MAC CE to a second MAC PDU without the BFR MAC CE (e.g., the second MAC PDU does not comprise the BFR MAC CE). For example, the second MAC PDU may be generated based upon the first MAC PDU (e.g., the second MAC PDU may comprise information, of the first MAC PDU, other than the BFR MAC CE). Alternatively and/or additionally, the first MAC PDU may be modified to generate the second MAC PDU (e.g., the first MAC PDU may be modified by removing the BFR MAC CE to generate the second MAC PDU).

Alternatively and/or additionally, the UE may not discard the BFR MAC CE associated with the first triggered BFR if the BFR MAC CE indicates beam failure of one or more other cells that are not associated with a deactivation. For example, the UE may not discard the BFR MAC CE associated with the first triggered BFR if the BFR MAC CE comprises beam failure information of one or more activated cells.

Alternatively and/or additionally, the UE may not cancel a triggered BFR that is not associated with a deactivated cell (e.g., a triggered BFR that is associated with an activated cell).

Alternatively and/or additionally, the UE may not stop a BFR procedure (e.g., an ongoing BFR procedure) associated with one or more cells (e.g., one or more activated cells) other than the first cell.

Figure 6:
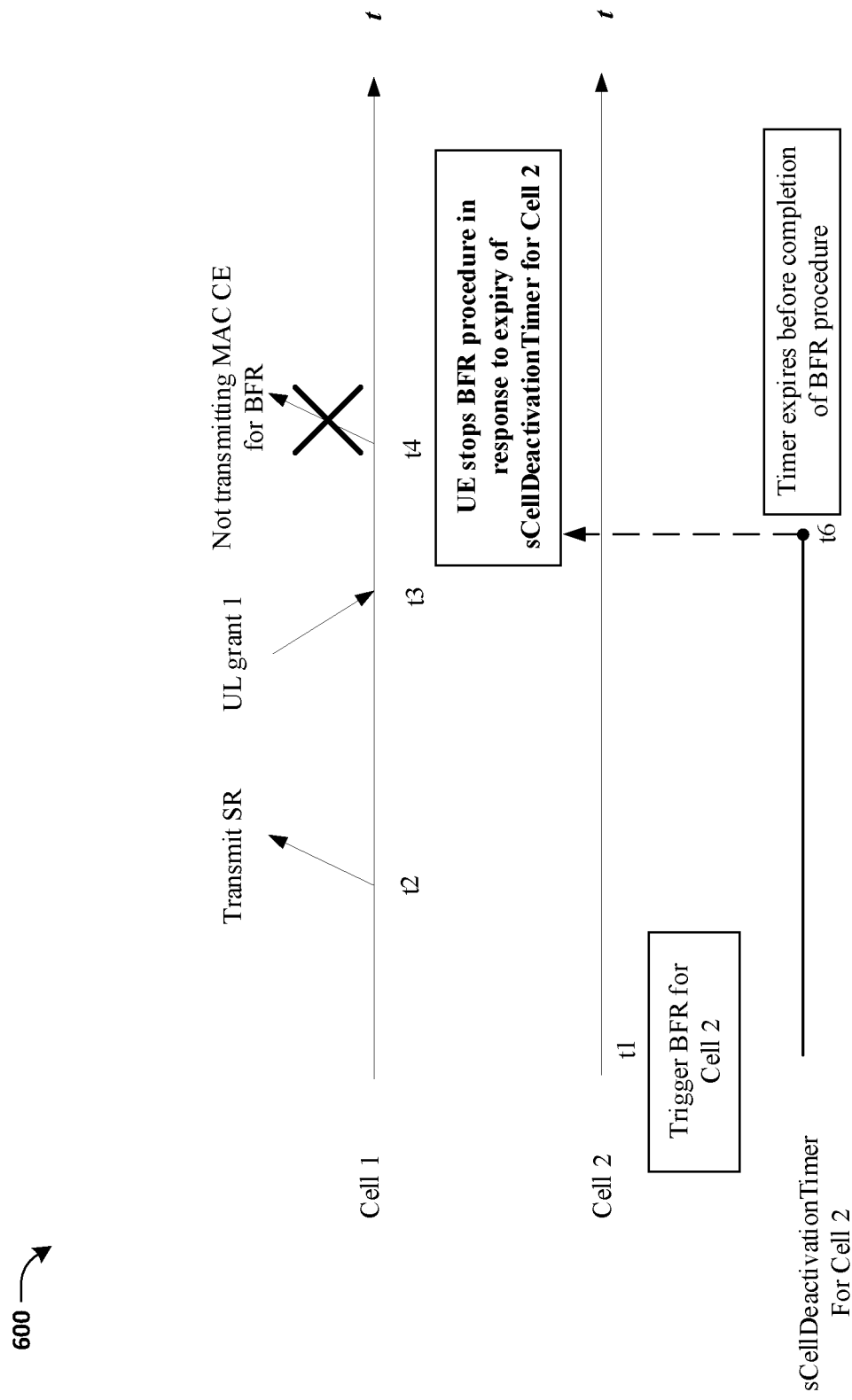
FIG. 6 is a diagram illustrating an exemplary scenario associated with a triggered BFR according to one exemplary embodiment.

FIG. 6 illustrates an exemplary scenario 600 associated with a triggered BFR, according to some embodiments. In the exemplary scenario 600, a UE is configured with multiple serving cells (e.g., two activated serving cells), Cell 1 and Cell 2. At a timing t1, the UE may trigger the triggered BFR (for SCell beam failure recovery, for example) associated with Cell 2 (e.g., the UE may trigger the triggered BFR in response to one or more beam failure indications associated with Cell 2 from one or more lower layers). In some examples, the UE performs a BFR procedure in response to the triggered BFR. Alternatively and/or additionally, the UE may trigger a SR in response to the triggered BFR. The UE may transmit the SR, at a timing t2, to a base station for requesting one or more UL resources. The base station indicates a first UL grant (shown as "UL grant 1" in FIG. 6) at a timing t3 via PDCCH (e.g., the first UL grant may be received by the UE, at the timing t3, via PDCCH). The UE is configured with a timer (e.g., sCellDeactivationTimer) associated with Cell 2 (e.g., the timer is shown as "sCellDeactivationTimer For Cell 2" in FIG. 6). The timer may expire at a timing t6. In response to expiration of the timer (e.g., sCellDeactivationTimer), the UE may deactivate Cell 2 and/or stop the BFR procedure. The UE does not transmit, to the base station, a BFR MAC CE indicating beam failure of Cell 2. For example, the first UL grant "UL grant 1" may indicate one or more UL resources for transmission of the BFR MAC CE at a timing t4 (e.g., the UE may use the first UL grant "UL grant 1" to transmit the BFR MAC CE at the timing t4 using a HARQ process). The UE may not transmit the BFR MAC CE at the timing t4 in response to expiration of the timer before the timing t4 (and/or the UE may not transmit the BFR MAC CE at the timing t4 in response to deactivation of Cell 2).

In some examples, the timer may expire before transmission of the SR (e.g., the timing t6 corresponding to the expiration of the timer may be before the timing t2 corresponding to transmission of the SR). In some examples, the UE does not transmit (and/or does not retransmit) a SR associated with the triggered BFR of Cell 2 to the base station if the timer expires. For example, if the timing t6 (corresponding to the expiration of the timer) is before the timing t2 (corresponding to transmission of the SR), the SR associated with the triggered BFR of Cell 2 may not be transmitted (and/or retransmitted) to the base station.

Alternatively and/or additionally, the UE may not generate a BFR MAC CE in response to a triggered BFR if the timer (e.g., sCellDeactivationTimer) expires after the triggered BFR is triggered.

EXAMPLE EMBODIMENT 2

In Example Embodiment 2, a UE may trigger a BFR and/or generate a BFR MAC CE, when a BFR procedure is ongoing, in response to deactivation of a cell.

In some examples, a UE transmits a first BFR MAC CE associated with a triggered BFR for a first cell. The UE may generate a second BFR MAC CE in response to deactivation associated with the first cell (e.g., deactivation of the first cell). The second BFR MAC CE may not indicate beam failure of one or more deactivated cells (e.g., the second BFR MAC CE may not indicate beam failure of the first cell based upon the deactivation of the first cell). The first BFR MAC CE may comprise beam failure information of multiple cells (e.g., the multiple cells may comprise the first cell and one or more other cells). In some examples, the first cell is deactivated after transmission (and/or generation) of the first BFR MAC CE (e.g., the first BFR MAC CE may indicate beam failure of the first cell due to the first cell being activated (and not deactivated) when the first BFR MAC CE is transmitted and/or generated). The UE may cancel a triggered BFR associated with one or more deactivated cells of the multiple cells (e.g., the one or more deactivated cells comprise the first cell). In some examples, the UE does not stop a BFR procedure associated with the one or more deactivated cells if the UE generates a BFR MAC CE (e.g., the first BFR MAC CE) in response to the BFR procedure and the BFR MAC CE comprises beam failure information of one or more cells (of the multiple cells) that are not deactivated. In some examples, the UE may not generate the second BFR MAC CE if the BFR procedure is complete (such as if the BFR procedure is completed before the first cell is deactivated for the UE). The UE may generate the second BFR MAC CE if the BFR procedure is not complete. For example, in response to deactivation of the first cell, the UE may generate the second BFR MAC CE if the BFR procedure is not complete (and/or if the multiple cells comprise one or more cells that are activated for the UE after the first cell is deactivated for the UE).

In some examples, the UE may discard the first BFR MAC CE (in response to deactivation of the first cell, for example). Alternatively and/or additionally, the UE may generate a MAC PDU that comprises the second BFR MAC CE and does not comprise the first BFR MAC CE. Alternatively and/or additionally, the UE may rebuild a first MAC PDU comprising the first BFR MAC CE to a second MAC PDU that comprises the second BFR MAC CE and does not comprise the first BFR MAC CE. For example, the second MAC PDU may be generated based upon the first MAC PDU (e.g., the second MAC PDU may comprise information, of the first MAC PDU, other than the first BFR MAC CE). Alternatively and/or additionally, the first MAC PDU may be modified to generate the second MAC PDU (e.g., the first MAC PDU may be modified by removing the first BFR MAC CE and adding the second BFR MAC CE to generate the second MAC PDU).

Figure 7:
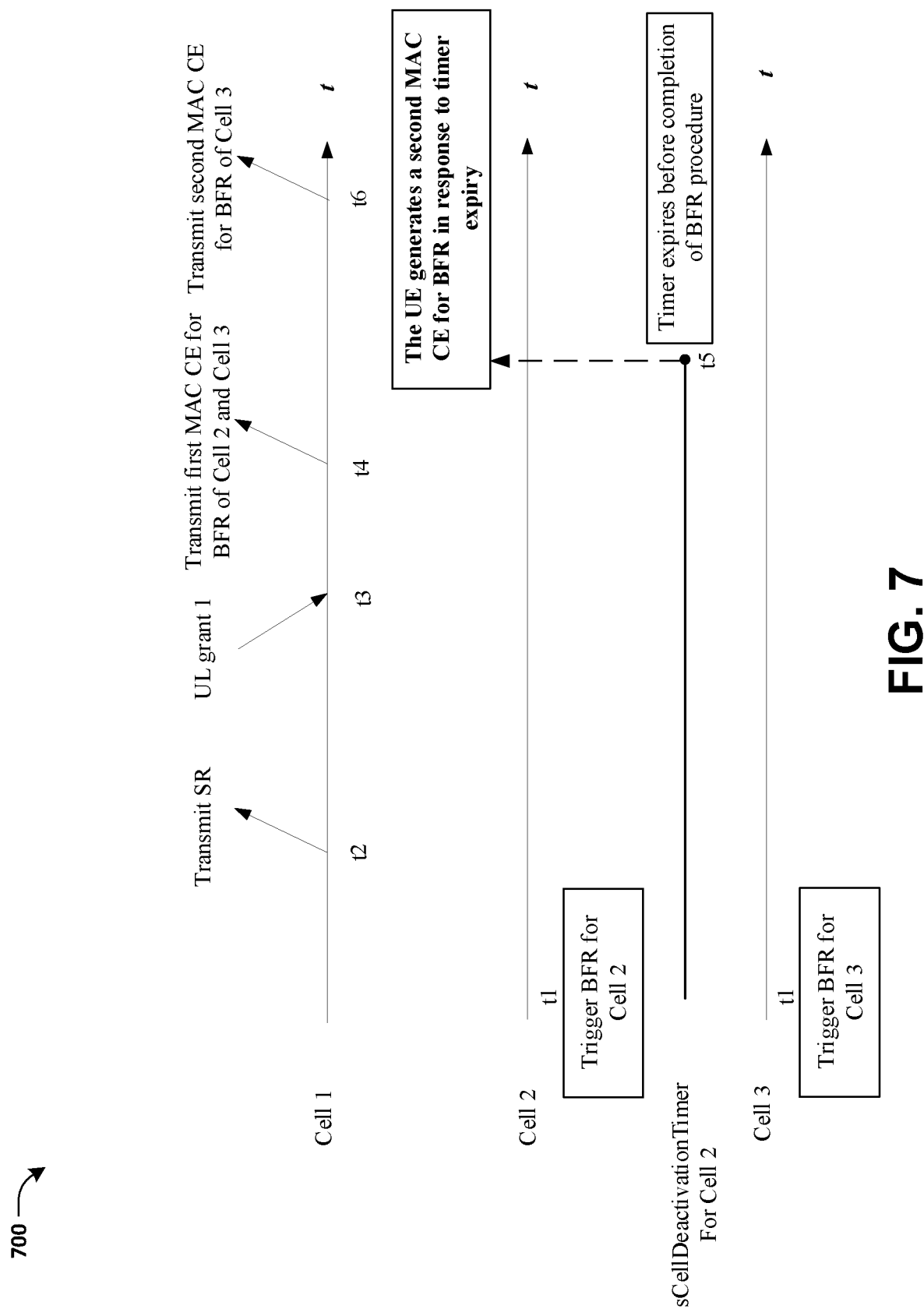
FIG. 7 is a diagram illustrating an exemplary scenario associated with a triggered BFR according to one exemplary embodiment.

FIG. 7 illustrates an exemplary scenario 700 associated with a triggered BFR, according to some embodiments. In the exemplary scenario 700, a UE is configured with multiple serving cells (e.g., three activated serving cells), Cell 1, Cell 2 and Cell 3. A UE triggers one or more BFRs associated with Cell 2 and Cell 3 at (and/or before) a timing t1 (e.g., the UE may trigger the one or more BFRs associated with Cell 2 and Cell 3 in response to one or more beam failure indications from lower layers). The one or more BFRs may comprise a first triggered BFR associated with Cell 2 and a second triggered BFR associated with Cell 3. In some examples, the UE performs a BFR procedure in response to the one or more BFRs associated with Cell 2 and Cell 3 (e.g., the BFR procedure may be performed in response to triggering the one or more BFRs). The UE may transmit a SR, at a timing t2, to a base station for requesting one or more UL resources. The base station indicates a first UL grant (shown as "UL grant 1" in FIG. 7) at a timing t3 via PDCCH (e.g., the first UL grant may be received by the UE, at the timing t3, via PDCCH). The UE may generate a first MAC CE (e.g., a first BFR MAC CE) associated with the one or more BFRs based upon the UL grant. At a timing t4, the UE may transmit the first MAC CE to the base station (e.g., the UE may transmit the first MAC CE using one or more UL resources of the first UL grant "UL grant 1"). The UE is configured with a timer (e.g., sCellDeactivationTimer) associated with Cell 2 (e.g., the timer is shown as "sCellDeactivationTimer For Cell 2" in FIG. 7). The timer may expire at a timing t5. In response to expiration of the timer (e.g., sCellDeactivationTimer), the UE may deactivate Cell 2. In response to expiration of the timer (e.g., sCellDeactivationTimer) and/or in response to deactivation of Cell 2, the UE may generate a second MAC CE (e.g., a second BFR MAC CE). The second MAC CE may comprise beam failure information of Cell 3 (e.g., the UE may generate the second MAC CE that comprises the beam failure information of Cell 3 based upon a determination that Cell 3 is not deactivated when the UE generates the second MAC CE). The second MAC CE may not comprise beam failure information of Cell 2 (e.g., the UE may generate the second MAC CE that does not comprise beam failure information of Cell 2 based upon a determination that Cell 2 is deactivated). At a timing t6, the UE may transmit the second MAC CE to the base station.

The first MAC CE may be transmitted on a cell of the multiple cells (e.g., at least one of Cell 1, Cell 2, Cell 3, etc.).

The second MAC CE may be transmitted on a cell of the multiple cells (e.g., at least one of Cell 1, Cell 2, Cell 3, etc.).

The first MAC CE may be transmitted on a cell that is different from a cell on which the second MAC CE is transmitted. Alternatively and/or additionally, the first MAC CE may be transmitted on a cell that is the same as a cell on which the second MAC CE is transmitted. For example, as shown in FIG. 7, both the first MAC CE and the second MAC CE may be transmitted on Cell 1.

In some examples, the UE may not generate the second MAC CE if cells (e.g., all cells), that are associated with beam failure information indicated in the first MAC CE, are deactivated. For example, the UE may not generate the second MAC CE if cells (e.g., all cells), for which beam failure is indicated by the first MAC CE, are deactivated.

Figure 8:
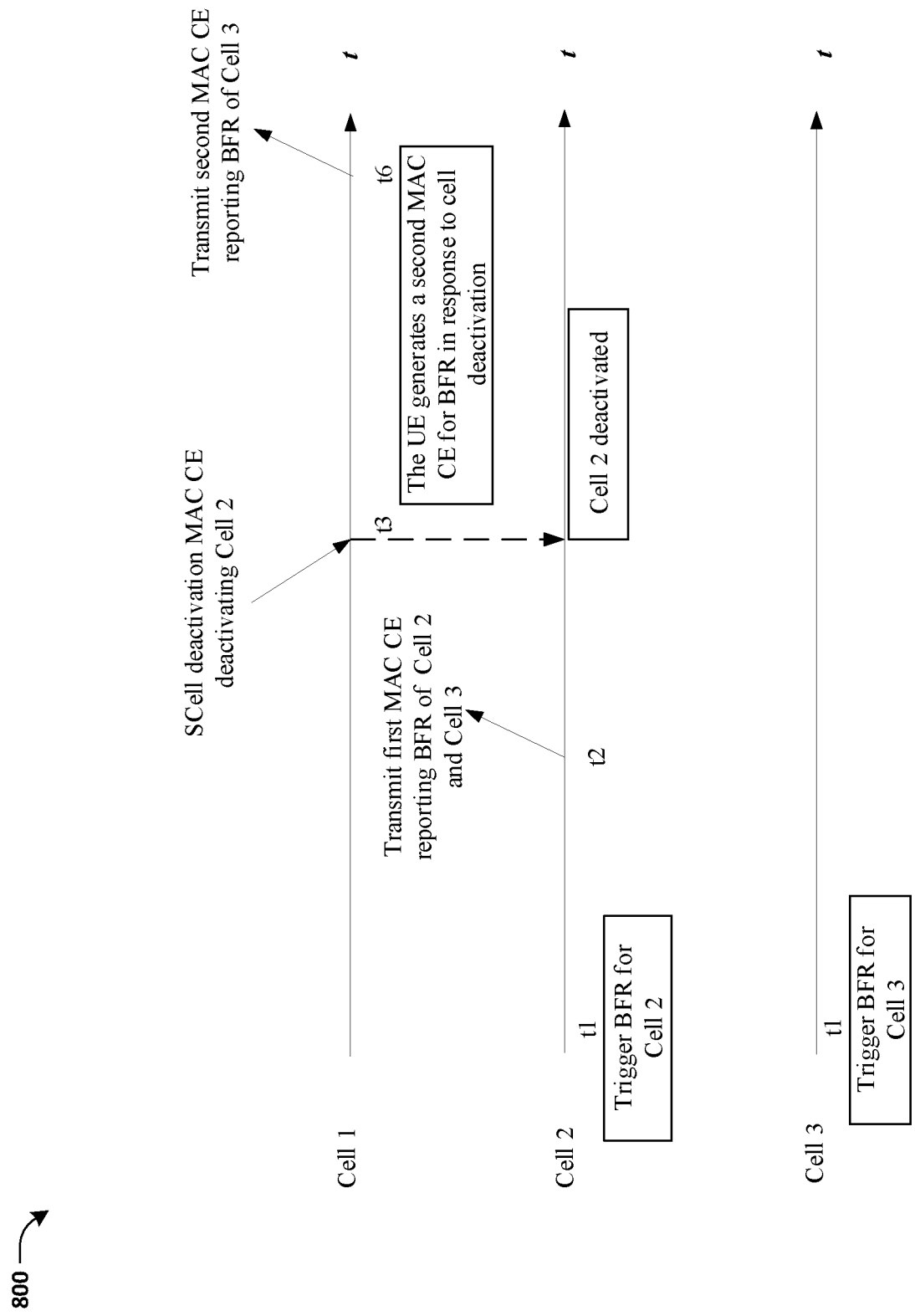
FIG. 8 is a diagram illustrating an exemplary scenario associated with a triggered BFR according to one exemplary embodiment.

FIG. 8 illustrates an exemplary scenario 800 associated with a triggered BFR, according to some embodiments. In the exemplary scenario 800, a UE is configured with multiple serving cells (e.g., three activated serving cells), Cell 1, Cell 2 and Cell 3. The multiple serving cells may be activated before a timing t1. A UE triggers one or more BFRs associated with Cell 2 and Cell 3 at (and/or before) the timing t1 (e.g., the UE may trigger the one or more BFRs associated with Cell 2 and Cell 3 in response to receiving one or more beam failure indications). The one or more BFRs may comprise a first triggered BFR associated with Cell 2 and a second triggered BFR associated with Cell 3. In some examples, the UE performs a BFR procedure in response to receiving the one or more beam failure indications and/or in response to the one or more BFRs associated with Cell 2 and Cell 3 (e.g., the BFR procedure may be performed in response to triggering the one or more BFRs). The UE may generate a first BFR MAC CE. The UE may transmit, at a timing t2, the first BFR MAC CE to a base station on Cell 2. The UE may use a configured grant on Cell 2 to transmit the first BFR MAC CE (e.g., the configured grant may correspond to one or more resources, on Cell 2, that the UE can use for transmission of the first BFR MAC CE). The first BFR MAC CE may comprise beam failure information of Cell 2 and Cell 3. The base station may transmit, to the UE, a SCell deactivation MAC CE for deactivating Cell 2 (e.g., the SCell deactivation MAC CE may be a MAC CE that indicates and/or instructs deactivation of Cell 2). The UE may receive the SCell deactivation MAC CE at a timing t3. Cell 2 may be deactivated in response to the SCell deactivation MAC CE. In response to deactivation of Cell 2, the UE may generate a second BFR MAC CE. The second BFR MAC CE may comprise beam failure information of Cell 3 (e.g., the UE may generate the second BFR MAC CE that comprises the beam failure information of Cell 3 based upon a determination that Cell 3 is activated (and/or not deactivated) when the UE generates the second BFR MAC CE). The second BFR MAC CE may not comprise beam failure information of Cell 2 (e.g., the UE may generate the second BFR MAC CE that does not comprise beam failure information of Cell 2 based upon a determination that Cell 2 is deactivated). At a timing t6, the UE may transmit the second BFR MAC CE on Cell 1. In some examples, in response to deactivation of Cell 2, the UE may not stop the BFR procedure based upon Cell 3 not being deactivated (and/or based upon Cell 3 being activated). For example, the UE may not stop the BFR procedure based upon at least one cell, of one or more cells reported and/or indicated by the first BFR MAC CE, not being deactivated (e.g., at least one cell of the one or more cells is activated). The one or more cells reported in and/or indicated by the first BFR MAC CE may correspond to one or more cells for which beam failure information is included in the first BFR MAC CE (e.g., the one or more cells may comprise Cell 2 and Cell 3). Alternatively and/or additionally, the UE may stop the BFR procedure if the one or more cells reported in and/or indicated by the first BFR MAC CE are all deactivated (e.g., if both Cell 2 and Cell 3 are deactivated).

With respect to one or more embodiments herein, in some examples, a cell (e.g., at least one of a cell, a first cell, Cell 1, Cell 2, Cell 3, etc. discussed in one or more example embodiments herein) may be a SCell. Alternatively and/or additionally, a cell may be a PCell and/or a Serving Cell.

With respect to one or more embodiments herein, in some examples, a deactivation of a cell may be in response to a SCell Activation/Deactivation MAC CE from a base station (e.g., the UE may deactivate the cell in response to receiving the SCell Activation/Deactivation MAC CE). For example, the SCell Activation/Deactivation MAC CE (e.g., a SCell Deactivation MAC CE) may indicate (and/or may be for) deactivation of the cell.

With respect to one or more embodiments herein, in some examples, a deactivation of a cell may be in response to a MAC CE transmitted by a base station (e.g., the UE may deactivate the cell in response to receiving the MAC CE).

With respect to one or more embodiments herein, in some examples, a deactivation of a cell may be in response to expiration of a timer. In some examples, the timer is sCell-DeactivationTimer associated with the cell.

With respect to one or more embodiments herein, in some examples, a triggered BFR may be considered to be pending before the triggered BFR is canceled (or completed).

With respect to one or more embodiments herein, in some examples, the UE may be configured with multiple Serving Cells.

With respect to one or more embodiments herein, in some examples, beam failure information is associated with one or more cells associated with beam failure. The beam failure information may comprise one or more cell identities indicative of the one or more cells associated with beam failure. For example, beam failure of the one or more cells may be reported via the one or more cell identities of the beam failure information.

With respect to one or more embodiments herein, in some examples, beam failure information is indicative of one or more candidate beams associated with one or more cells.

With respect to one or more embodiments herein, in some examples, beam failure information indicates presence of one or more candidate beams (e.g., the beam failure information may indicate whether or not one or more candidate beams are present and/or available).

With respect to one or more embodiments herein, in some examples, a BFR MAC CE (e.g., a MAC CE for BFR) may comprise beam failure information of one cell.

With respect to one or more embodiments herein, in some examples, a BFR MAC CE (e.g., a MAC CE for BFR) may comprise beam failure information of multiple cells.

With respect to one or more embodiments herein, in some examples, the UE transmits the BFR MAC CE and/or the SR on a cell different from a cell associated with a triggered BFR. In some examples, the UE performs the SR transmission on a cell different from a cell associated with a triggered BFR.

With respect to one or more embodiments herein, in some examples, a BFR procedure may comprise transmission of a SR or a SR transmission (e.g., a SR associated with a triggered BFR and/or a SR for SCell beam failure recovery). Alternatively and/or additionally, the BFR procedure may be (and/or may consist of) transmission of a SR or a SR transmission (e.g., a SR associated with a triggered BFR and/or a SR for SCell beam failure recovery).

With respect to one or more embodiments herein, in some examples, a BFR procedure may comprise transmission of a BFR MAC CE indicating beam failure information associated with one or more cells (e.g., one or more failed Serving Cells). Alternatively and/or additionally, the BFR procedure may be (and/or may consist of) transmission of a BFR MAC CE indicating beam failure information associated with one or more cells (e.g., one or more failed Serving Cells).

With respect to one or more embodiments herein, in some examples, a BFR procedure may be considered to be completed and/or finished when the UE receives a PDCCH signal indicating an UL grant for a HARQ process used to transmit a BFR MAC CE associated with the BFR procedure (e.g., the UL grant may correspond to one or more UL resources that can be used for transmission of the BFR MAC CE).

With respect to one or more embodiments herein, in some examples, the UE may generate a BFR MAC CE if a triggered BFR (e.g., a BFR that is triggered, such as at least one of the first triggered BFR, the first BFR, etc. discussed in one or more example embodiments herein) is not canceled and if and/or when there are one or more Uplink Shared Channel (UL-SCH) resources available that are for accommodating (and/or that can accommodate transmission of) the BFR MAC CE and a subheader of the BFR MAC CE (as a result of logical channel prioritization, for example).

With respect to one or more embodiments herein, in some examples, the UE may trigger a SR for SCell beam failure recovery if a triggered BFR (e.g., a BFR that is triggered, such as at least one of the first triggered BFR, the first BFR, etc. discussed in one or more example embodiments herein) is not canceled and if no UL-SCH resources are available that are for accommodating (and/or that can accommodate transmission of) a BFR MAC CE and a subheader of the BFR MAC CE (as a result of logical channel prioritization, for example).

With respect to one or more embodiments herein, in some examples, if a number of beam failure indications of one or more beam failure indications (e.g., beam failure instance indications) associated with a cell (received from one or more lower layers) is larger than or equal to a threshold, and the cell is a SCell, the UE may trigger a BFR (of the cell). The UE may determine whether or not to trigger the BFR based upon whether the cell is PCell or SCell. For example, the UE may not trigger a BFR if the cell is a PCell.

With respect to one or more embodiments herein, in some examples, transmission of the SR or SR transmission is used and/or performed for indicating information to a serving gNB in response to detecting beam failure on one or more serving Synchronization Signal Blocks (SSBs) and/or one or more serving Channel State Information Reference Signals (CSI-RSs) (and/or transmission of the SR or SR transmission may be used and/or performed for indicating the information to the serving gNB when beam failure on the one or more serving SSBs and/or the one or more serving CSI-RSs is detected). The information may comprise a new SSB (e.g., a SSB different from the one or more serving SSBs) and/or a new CSI-RS (e.g., a CSI-RS different from the one or more serving CSI-RSs).

With respect to one or more embodiments herein, in some examples, a failed Serving Cell may be a serving cell associated with a triggered (and not canceled) BFR.

One, some and/or all of the foregoing techniques, concepts and/or embodiments can be formed to a new embodiment.

In some examples, embodiments disclosed herein, such as embodiments described with respect to Example Embodiment 1 and Example Embodiment 2, may be implemented independently and/or separately. Alternatively and/or additionally, a combination of embodiments described herein, such as embodiments described with respect to Example Embodiment 1 and/or Example Embodiment 2, may be implemented. Alternatively and/or additionally, a combination of embodiments described herein, such as embodiments described with respect to Example Embodiment 1 and/or Example Embodiment 2, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 9:
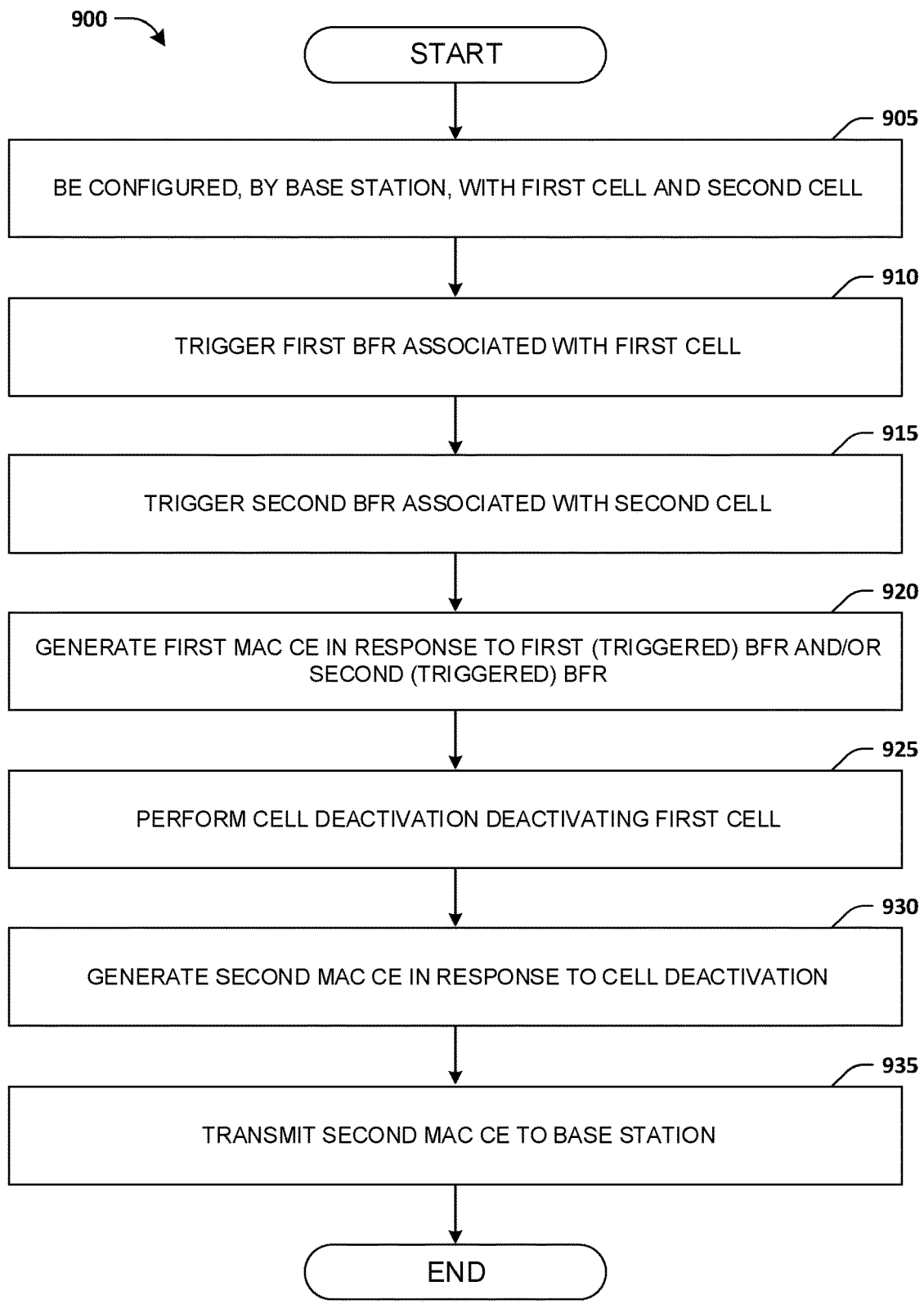
FIG. 9 is a flow chart according to one exemplary embodiment.

FIG. 9 is a flow chart 900 according to one exemplary embodiment from the perspective of a UE. In step 905, the UE is configured, by a base station, with a first cell and a second cell. In step 910, the UE triggers a first BFR associated with the first cell. In step 915, the UE triggers a second BFR associated with the second cell. In step 920, the UE generates a first MAC CE in response to the first (triggered) BFR and/or the (triggered) second BFR. In step 925, the UE performs a cell deactivation deactivating the first cell. In step 930, the UE generates a second MAC CE in response to the cell deactivation. In step 935, the UE transmits the second MAC CE to the base station.

In one embodiment, the UE deactivates the first cell in response to a third MAC CE transmitted by the base station, wherein the third MAC CE indicates deactivation of the first cell.

In one embodiment, the UE deactivates the first cell in response to expiration of a timer associated with the first cell.

In one embodiment, the UE does not transmit the first MAC CE if (and/or after) the UE generates the second MAC CE.

In one embodiment, the UE cancels the first (triggered) BFR in response to the cell deactivation.

In one embodiment, the UE does not stop a BFR procedure associated with the first (triggered) BFR and the second (triggered) BFR in response to the cell deactivation (e.g., the UE may not stop the BFR procedure based upon a determination that the BFR procedure is associated with at least one cell that is not deactivated, such as the second cell).

In one embodiment, the UE transmits the first MAC CE on the first cell, the second cell, or one or more other activated cells.

In one embodiment, the UE transmits the first MAC CE on a first cell different than a second cell on which the UE transmits the second MAC CE.

In one embodiment, the UE transmits the first MAC CE and the second MAC CE on a same cell.

In one embodiment, the first MAC CE indicates beam failure information associated with the first cell and the second cell In one embodiment, the second MAC CE indicates beam failure information associated with the second cell. The second MAC CE does not indicate beam failure information associated with the first cell.

Referring back to FIGS. 3 and 4, in one exemplary embodiment of a UE, the device 300 includes a program code 312 stored in the memory 310. The CPU 308 could execute program code 312 to enable the UE (i) to be configured, by a base station, with a first cell and a second cell, (ii) to trigger a first BFR associated with the first cell, (iii) to trigger a second BFR associated with the second cell, (iv) to generate a first MAC CE in response to the first (triggered) BFR and/or the (triggered) second BFR, (v) to perform a cell deactivation deactivating the first cell, (vi) to generate a second MAC CE in response to the cell deactivation, and (vii) to transmit the second MAC CE to the base station. Furthermore, the CPU 308 can execute the program code 312 to perform one, some and/or all of the above-described actions and steps and/or others described herein.

Figure 10:
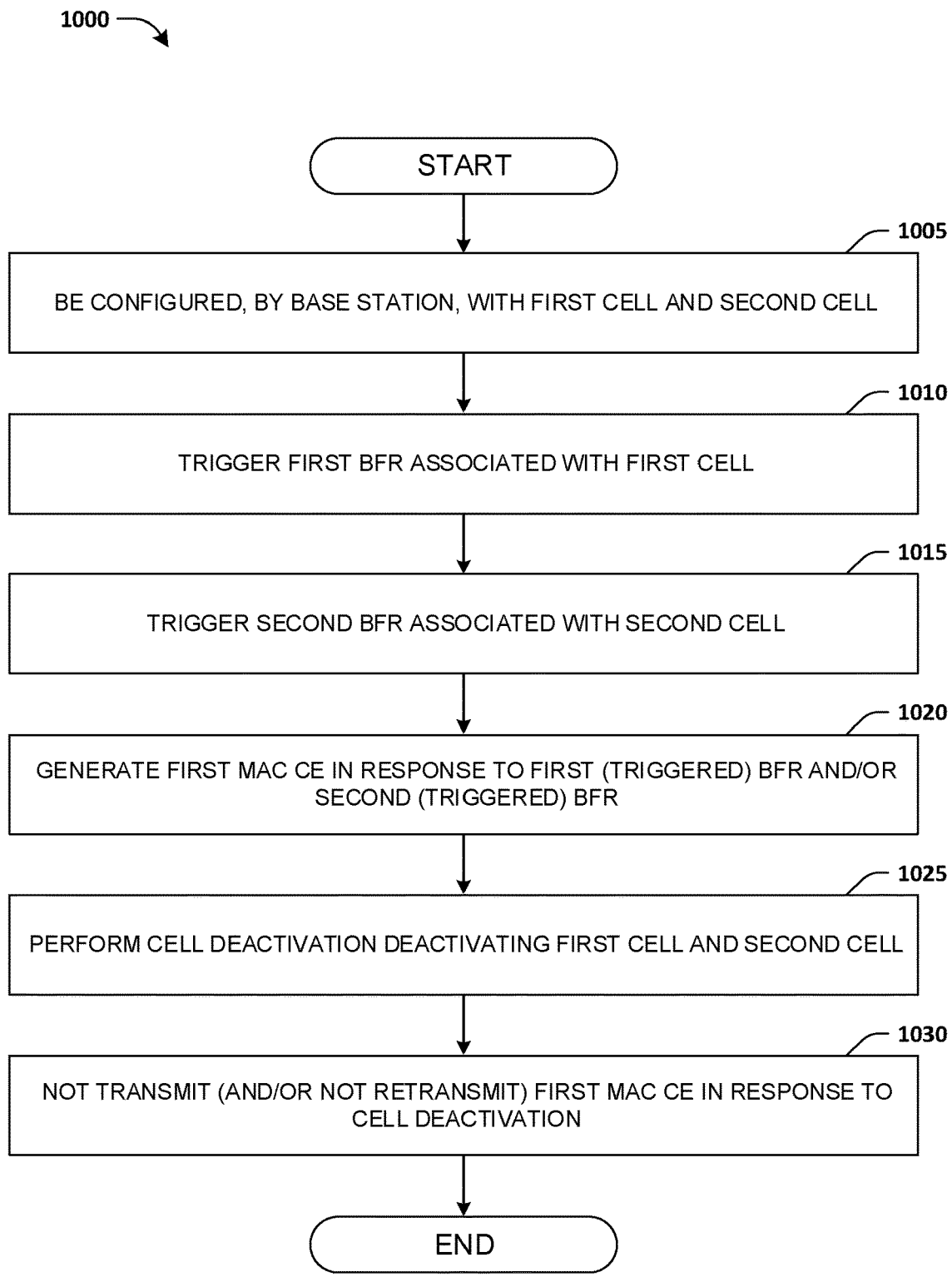
FIG. 10 is a flow chart according to one exemplary embodiment.

FIG. 10 is a flow chart 1000 according to one exemplary embodiment from the perspective of a UE. In step 1005, the UE is configured, by a base station, with a first cell and a second cell. In step 1010, the UE triggers a first BFR associated with the first cell. In step 1015, the UE triggers a second BFR associated with the second cell. In step 1020, the UE generates a first MAC CE in response to the first (triggered) BFR and/or the (triggered) second BFR. In step 1025, the UE performs a cell deactivation deactivating the first cell and the second cell. In step 1030, the UE does not transmit (and/or does not retransmit) the first MAC CE in response to the cell deactivation.

In one embodiment, the UE cancels the first (triggered) BFR in response to the cell deactivation.

In one embodiment, the UE cancels the second BFR in response to the cell deactivation.

In one embodiment, the UE stops a BFR procedure associated with the first (triggered) BFR and the second BFR in response to the cell deactivation (e.g., the UE may stop the BFR procedure based upon a determination that cells, such as the first cell and/or the second cell, associated with the BFR procedure are deactivated and/or a determination that no cell of the cells is activated).

In one embodiment, the UE performs the cell deactivation in response to a MAC CE transmitted by the base station.

In one embodiment, the UE deactivates the first cell and the second cell in response to one or more MAC CEs transmitted by the base station, wherein the one or more MAC CEs indicate deactivation of the first cell and the second cell.

In one embodiment, the UE deactivates the first cell and the second cell in response to a third MAC CE transmitted by the base station, wherein the third MAC CE indicates deactivation of the first cell and the second cell.

In one embodiment, the UE deactivates the first cell in response to expiration of a timer associated with the first cell.

In one embodiment, the UE deactivates the second cell in response to expiration of a timer associated with the second cell.

In one embodiment, the first MAC CE indicates beam failure information associated with the first cell and the second cell.

Referring back to FIGS. 3 and 4, in one exemplary embodiment of a UE, the device 300 includes a program code 312 stored in the memory 310. The CPU 308 could execute program code 312 to enable the UE (i) to be configured, by a base station, with a first cell and a second cell, (ii) to trigger a first BFR associated with the first cell, (iii) to trigger a second BFR associated with the second cell, (iv) to generate a first MAC CE in response to the first (triggered) BFR and/or the (triggered) second BFR, (v) to perform a cell deactivation deactivating the first cell and the second cell, and (vi) to not transmit (and/or to not retransmit) the first MAC CE in response to the cell deactivation. Furthermore, the CPU 308 can execute the program code 312 to perform one, some and/or all of the above-described actions and steps and/or others described herein.

With respect to FIGS. 9-10, in one embodiment, the first cell is a SCell and/or the second cell is a SCell.

In one embodiment, the first cell is a PCell and/or the second cell is a PCell.

In one embodiment, the UE is configured with one or more cells in addition to the first cell and the second cell.

In one embodiment, beam failure information indicates one or more cell identities of one or more associated cells. In an example where the beam failure information is associated with the first cell and the second cell, the beam failure information may indicate a first cell identity associated with the first cell and a second cell identity associated with the second cell.

In one embodiment, beam failure information indicates one or more candidate beams (e.g., one or more candidate beam indexes) for BFR of one or more associated cells. In an example where the beam failure information is associated with the first cell and the second cell, the beam failure information may indicate one or more first candidate beams (e.g., one or more first candidate beam indexes) for BFR of the first cell and one or more second candidate beams (e.g., one or more second candidate beam indexes) for BFR of the second cell.

In one embodiment, the BFR procedure associated with one or more BFRs (such as the first (triggered) BFR and/or the second (triggered) BFR) comprises transmitting a SR to the base station.

In one embodiment, the BFR procedure associated with one or more BFRs (such as the first (triggered) BFR and/or the (triggered) second BFR) comprises transmitting (and/or retransmitting) a MAC CE, associated with the one or more BFRs, to the base station.

In one embodiment, a BFR associated with a cell (e.g., the first (triggered) BFR associated with the first cell and/or the second (triggered) BFR associated with the second cell) is triggered in response to one or more beam failure indications (e.g., one or more beam failure indications associated with the cell) received from a lower layer of the UE.

Figure 11:
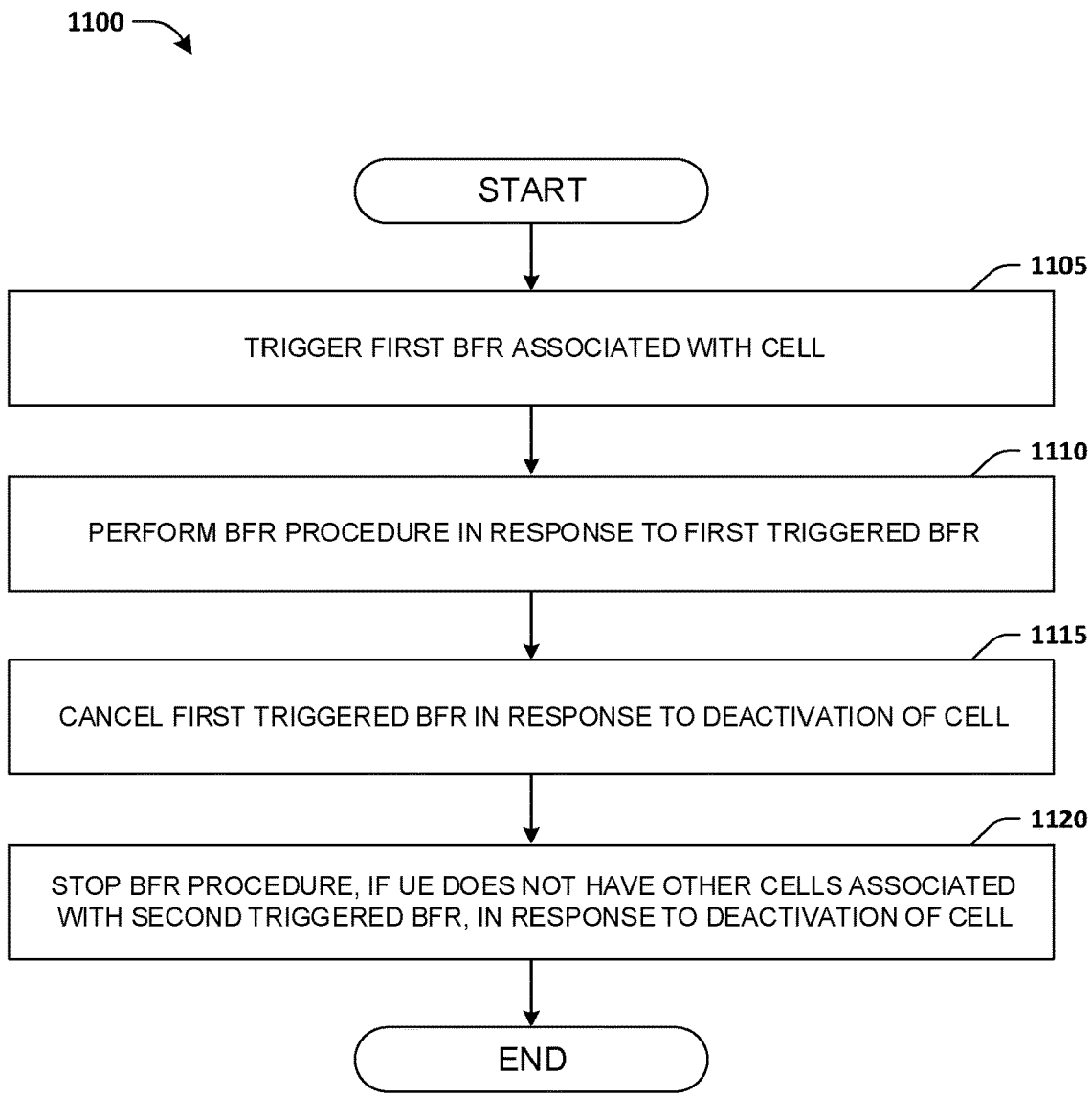
FIG. 11 is a flow chart according to one exemplary embodiment.

FIG. 11 is a flow chart 1100 according to one exemplary embodiment from the perspective of a UE. In step 1105, the UE triggers a first BFR associated with a cell. In step 1110, the UE performs a BFR procedure in response to the first triggered BFR. In step 1115, the UE cancels the first triggered BFR in response to deactivation of the cell. In step 1120, the UE stops the BFR procedure, if the UE does not have other cells associated with a second triggered BFR, in response to the deactivation of the cell (e.g., in response to the deactivation of the cell, the UE may stop the BFR procedure if the UE does not have any activated cell associated with the second triggered BFR).

In one embodiment, the BFR procedure comprises transmitting a SR associated with the first triggered BFR and/or the second triggered BFR.

In one embodiment, the BFR procedure comprises transmitting a BFR MAC CE associated with the first triggered BFR and/or the second triggered BFR.

In one embodiment, the UE does not stop the BFR procedure (such as in response to the deactivation of the cell) if there is an activated cell (e.g., an activated cell that the UE is configured with) associated with the second triggered BFR.

In one embodiment, the UE generates a BFR MAC CE if the first triggered BFR is not canceled and if one or more UL-SCH resources are available for accommodating the BFR MAC CE and a subheader of the BFR MAC CE (e.g., the UE may generate the BFR MAC CE if the first triggered BFR is not canceled and if one or more UL-SCH resources, that can accommodate the BFR MAC CE and the subheader of the BFR MAC CE, are available).

In one embodiment, the UE triggers a SR for SCell beam failure recovery if the first triggered BFR is not canceled and if UL-SCH resources are not available for accommodating a BFR MAC CE and a subheader of the BFR MAC CE (e.g., the UE may trigger the SR for SCell beam failure recovery if the first triggered BFR is not canceled and if UL-SCH resources that can accommodate the BFR MAC CE and the subheader of the BFR MAC CE are unavailable).

In one embodiment, the UE cancels a (triggered) SR (associated with the cell), that is triggered for the first triggered BFR, in response to the deactivation of the cell.

In one embodiment, the cell is a SCell associated with a Master Cell Group (MCG) or a Secondary Cell Group (SCG).

In one embodiment, the UE stops a random access procedure, that is initiated in response to the first triggered BFR, in response to the deactivation of the cell.

In one embodiment, the deactivation of the cell is in response to the UE receiving a SCell Activation/Deactivation MAC CE from a base station (e.g., a SCell Deactivation MAC CE that indicates (and/or is for) deactivation of the cell).

In one embodiment, the deactivation of the cell is in response to expiration of a timer.

In one embodiment, the BFR procedure is used and/or performed for indicating information to a serving gNB in response to detecting beam failure on one or more serving SSBs and/or one or more serving CSI-RSs (and/or the BFR procedure may be used and/or performed for indicating the information to the serving gNB when beam failure on the one or more serving SSBs and/or the one or more serving CSI-RSs is detected). The information may comprise a new SSB (e.g., a SSB different from the one or more serving SSBs) and/or a new CSI-RS (e.g., a CSI-RS different from the one or more serving CSI-RSs).

Referring back to FIGS. 3 and 4, in one exemplary embodiment of a UE, the device 300 includes a program code 312 stored in the memory 310. The CPU 308 could execute program code 312 to enable the UE (i) to trigger a first BFR associated with a cell, (ii) to perform a BFR procedure in response to the first triggered BFR, (iii) to cancel the first triggered BFR in response to deactivation of the cell, and (iv) to stop the BFR procedure, if the UE does not have other cells associated with a second triggered BFR, in response to the deactivation of the cell. Furthermore, the CPU 308 can execute the program code 312 to perform one, some and/or all of the above-described actions and steps and/or others described herein.

Figure 12:
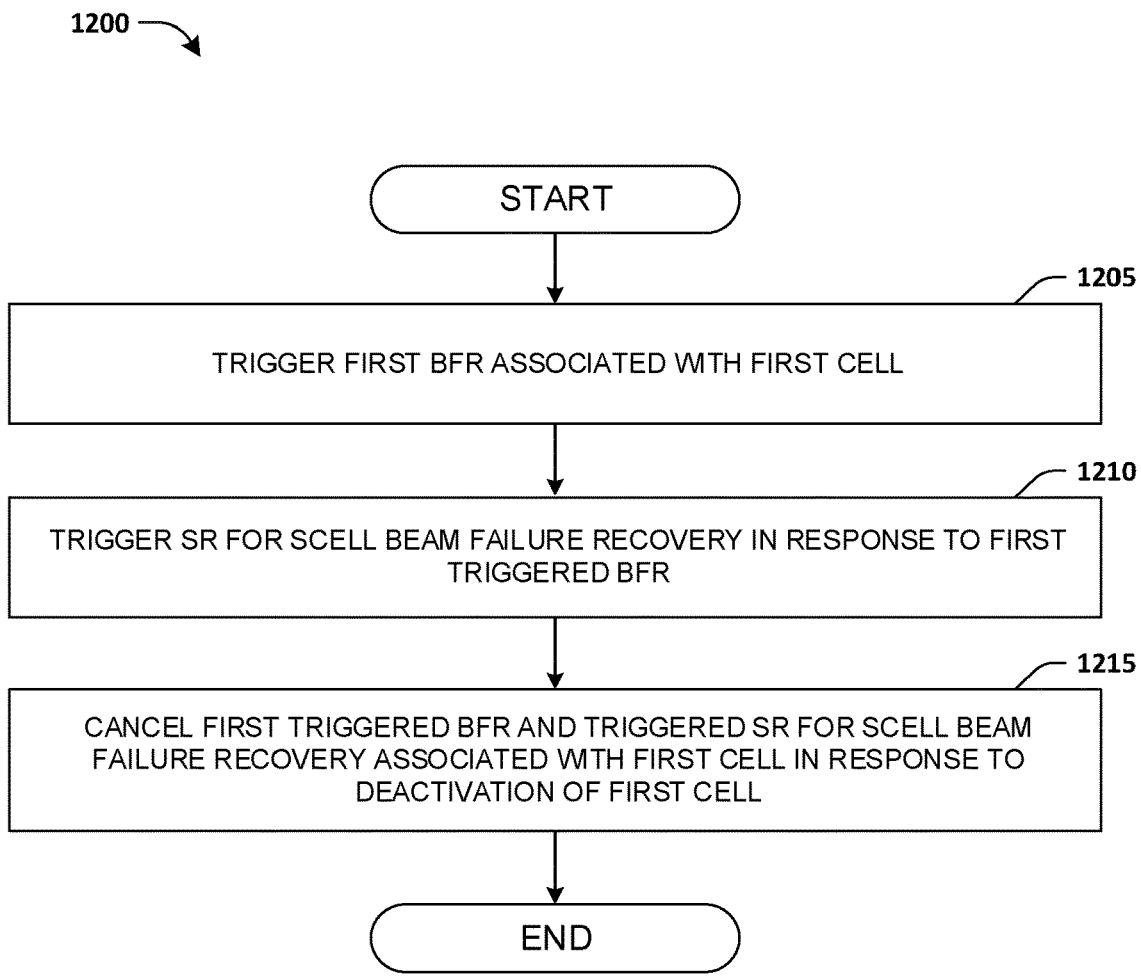
FIG. 12 is a flow chart according to one exemplary embodiment.

FIG. 12 is a flow chart 1200 according to one exemplary embodiment from the perspective of a UE. In step 1205, the UE triggers a first BFR associated with a first cell. In step 1210, the UE triggers a SR for SCell beam failure recovery in response to the first triggered BFR. For example, the UE may trigger the SR for SCell beam failure recovery in response to the first triggered BFR being triggered by the UE. In step 1215, the UE cancels the first triggered BFR and the triggered SR for SCell beam failure recovery associated with the first cell in response to deactivation of the first cell.

In one embodiment, in response to the deactivation of the first cell, the UE stops transmission of SR or SR transmission for SCell beam failure recovery if the UE does not have a cell (e.g., an activated cell), other than the first cell, associated with a second triggered BFR. In an example, in response to the deactivation of the first cell, the UE may not transmit the SR for SCell beam failure recovery if the UE does not have a cell (e.g., an activated cell), other than the first cell, associated with a second triggered BFR.

In one embodiment, in response to the deactivation of the first cell, the UE may not stop transmission of SR or SR transmission for SCell beam failure recovery if the UE has a cell (e.g., an activated cell), other than the first cell, associated with a second triggered BFR. In an example, in response to the deactivation of the first cell, the UE may transmit SR for SCell beam failure recovery if the UE has a cell (e.g., an activated cell), other than the first cell, associated with a second triggered BFR.

In one embodiment, in response to the deactivation of the first cell, the UE stops transmission of the SR or the SR transmission for SCell beam failure recovery if there are not any cells (with which the UE is configured) that are activated and are associated with a triggered BFR. In an example, in response to the deactivation of the first cell, the UE may not transmit the SR for SCell beam failure recovery if there are not any cells (with which the UE is configured) that are activated and are associated with a triggered BFR.

In one embodiment, prior to the canceling the first triggered BFR, the UE generates a BFR MAC CE if one or more UL-SCH resources, for accommodating the BFR MAC CE and a subheader of the BFR MAC CE, are available. In an example, the UE may generate the BFR MAC CE if the first triggered BFR is not canceled and the one or more UL-SCH resources, for accommodating the BFR MAC CE and the subheader of the BFR MAC CE, are available. In an example, the UE may generate the BFR MAC CE if the first triggered BFR is not canceled and one or more UL-SCH resources, that can accommodate transmission of the BFR MAC CE and the subheader of the BFR MAC CE, are available.

In one embodiment, the UE triggers the SR for SCell beam failure recovery based upon the first triggered BFR not being canceled and based upon an unavailability of UL-SCH resources for accommodating a BFR MAC CE and a subheader of the BFR MAC CE. For example, in response to the first triggered BFR, the UE may trigger the SR for SCell beam failure recovery if the first triggered BFR is not canceled and one or more UL-SCH resources that can accommodate transmission of a BFR MAC CE and a subheader of the BFR MAC CE are unavailable.

In one embodiment, the first cell is a SCell associated with a MCG or a SCG. For example, the MCG or the SCG may comprise the first cell.

In one embodiment, the UE initiates a random access procedure in response to the first triggered BFR. For example, the UE may trigger the random access procedure in response to the first triggered BFR being triggered by the UE. In response to the deactivation of the first cell, the UE stops the random access procedure.

In one embodiment, the deactivation of the first cell is performed in response to the UE receiving a MAC CE (e.g., a SCell Activation/Deactivation MAC CE), associated with SCell Deactivation, from a base station, or in response to expiration of a SCell deactivation timer.

In one embodiment, the UE determines whether or not to trigger the first BFR based upon whether or not the first cell is a SCell. For example, the UE may determine to trigger the first BFR based upon the first cell being a SCell.

In one embodiment, the UE transmits the SR for SCell beam failure recovery on a second cell different from the first cell. In other words, the UE performs the SR transmission for SCell beam failure recovery on a second cell different from the first cell.

Referring back to FIGS. 3 and 4, in one exemplary embodiment of a UE, the device 300 includes a program code 312 stored in the memory 310. The CPU 308 could execute program code 312 to enable the UE (i) to trigger a first BFR associated with a first cell, (ii) to trigger a SR for SCell beam failure recovery in response to the first triggered BFR, and (iii) to cancel the first triggered BFR and the triggered SR for SCell beam failure recovery associated with the first cell in response to deactivation of the first cell. Furthermore, the CPU 308 can execute the program code 312 to perform one, some and/or all of the above-described actions and steps and/or others described herein.

Figure 13:
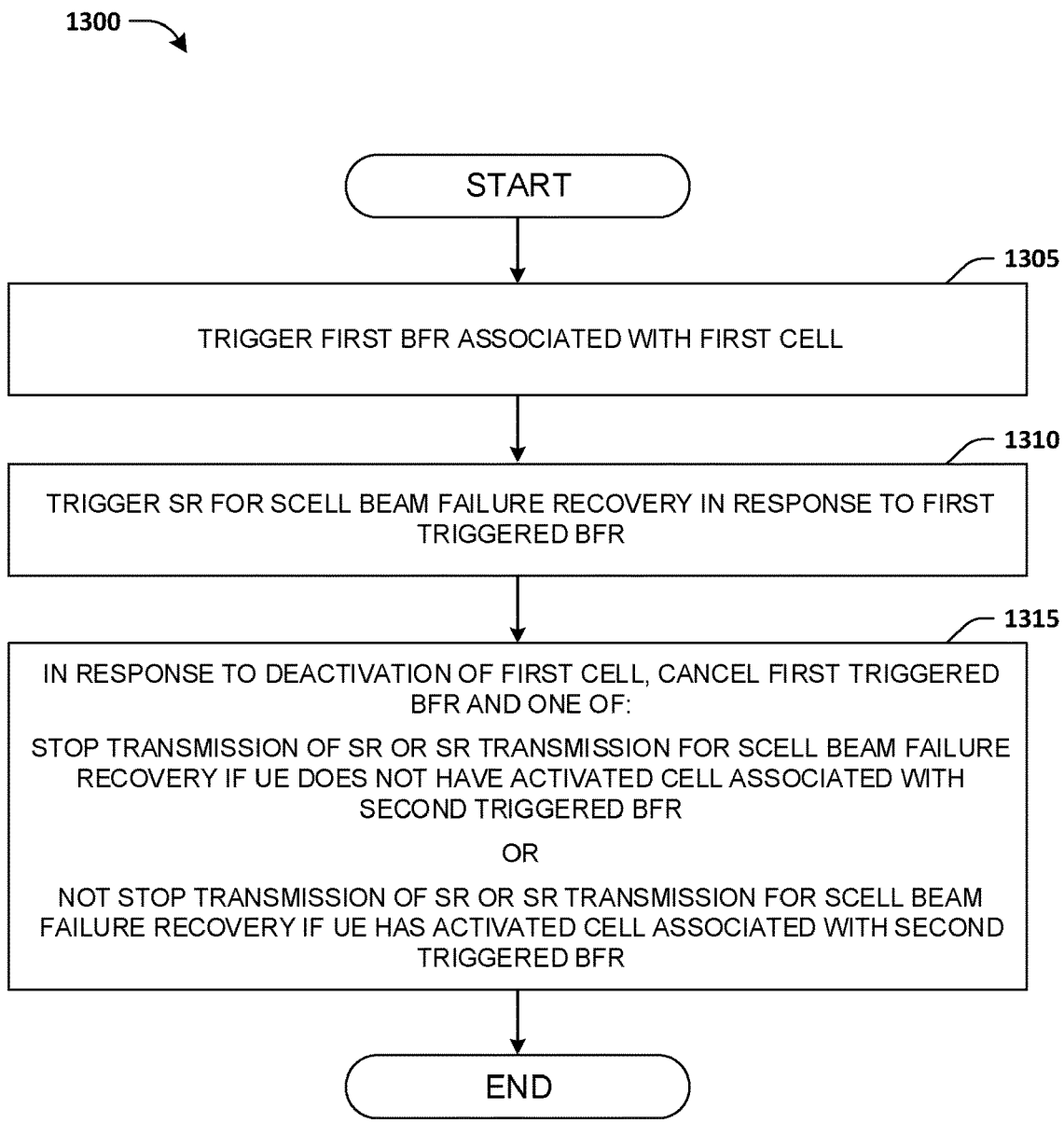
FIG. 13 is a flow chart according to one exemplary embodiment.

FIG. 13 is a flow chart 1300 according to one exemplary embodiment from the perspective of a UE. In step 1305, the UE triggers a first BFR associated with a first cell. In step 1310, the UE triggers a SR for SCell beam failure recovery in response to the first triggered BFR. For example, the UE may trigger the SR for SCell beam failure recovery in response to the first triggered BFR being triggered by the UE. In step 1315, in response to deactivation of the first cell, the UE cancels the first triggered BFR and one of stops transmission of SR or SR transmission for SCell beam failure recovery if the UE does not have an activated cell associated with a triggered BFR, or does not stop transmission of the SR or the SR transmission for SCell beam failure recovery if the UE has an activated cell associated with a second triggered BFR.

In an example, in response to the deactivation of the first cell, the UE stops transmission of SR or SR transmission for SCell beam failure recovery (and/or the UE may not transmit the SR for SCell beam failure recovery) if there are not any cells (with which the UE is configured) that are activated and are associated with a triggered (and/or pending) BFR.

In an example, in response to the deactivation of the first cell, the UE does not stop transmission of SR or SR transmission for SCell beam failure recovery (and/or the UE may transmit the SR for SCell beam failure recovery) if one or more cells (with which the UE is configured) are activated and are associated with a triggered (and/or pending) BFR.

In one embodiment, the deactivation of the first cell is performed in response to the UE receiving a MAC CE (e.g., a SCell Activation/Deactivation MAC CE), associated with SCell deactivation, from a base station, or in response to expiration of a SCell deactivation timer.

Referring back to FIGS. 3 and 4, in one exemplary embodiment of a UE, the device 300 includes a program code 312 stored in the memory 310. The CPU 308 could execute program code 312 to enable the UE (i) to trigger a first BFR associated with a first cell, (ii) to trigger a SR for SCell beam failure recovery in response to the first triggered BFR, and (iii) in response to deactivation of the first cell, to cancel the first triggered BFR and one of: stop transmission of SR or SR transmission for SCell beam failure recovery if the UE does not have an activated cell associated with a triggered BFR; or not stop transmission of the SR or the SR transmission for SCell beam failure recovery if the UE has an activated cell associated with a second triggered BFR. Furthermore, the CPU 308 can execute the program code 312 to perform one, some and/or all of the above-described actions and steps and/or others described herein.

To enhance 3GPP specification for wireless communication in accordance with some embodiments herein, Enhancement 1, Enhancement 2 and Enhancement 3 are provided herein. Each of Enhancements 1-3 is reflective of implementation in accordance with some embodiments herein, and comprises an addition to a list of acts in Section 5.9 of 3GPP TS 38.321, V15.7.0. The list of acts corresponds to acts that may be performed by a device if a SCell Activation/Deactivation MAC CE that deactivates a SCell is received, or if a timer (e.g., sCellDeactivationTimer) associated with the SCell expires. A portion of Section 5.9 of 3GPP TS 38.321, V15.7.0, which contains the list of acts, is quoted below, where conditions upon which a device may perform one or more acts of the list of acts are preceded by "1>" and list items of the list of acts are preceded by "2>":

1>else if an SCell Activation/Deactivation MAC CE is received deactivating the SCell; or
1>if the sCellDeactivationTimer associated with the activated SCell expires:
  2>deactivate the SCell according to the timing defined in TS 38.213 [6];
  2>stop the sCellDeactivationTimer associated with the SCell;
  2>stop the bwp-InactivityTimer associated with the SCell;
  2>deactivate any active BWP associated with the SCell;
  2>clear any configured downlink assignment and any configured uplink grant Type 2 associated with the SCell respectively;
  2>clear any PUSCH resource for semi-persistent CSI reporting associated with the SCell;
  2>suspend any configured uplink grant Type 1 associated with the SCell;
  2>flush all HARQ buffers associated with the SCell.

In Enhancement 1, an additional list item is added to the list of acts in accordance with some embodiments of the present disclosure. The additional list item of Enhancement 1 corresponds to an act of stopping transmission of SRs or SR transmissions associated with BFR associated with a SCell (e.g., the SCell is deactivated). A modified version of the portion of Section 5.9 of 3GPP TS 38.321, V15.7.0, containing the additional list item of Enhancement 1, is provided below. The additional list item of Enhancement 1 is preceded by the term "ADDITIONAL LIST ITEM:" to distinguish the additional list item from other list items originally included in Section 5.9 of 3GPP TS 38.321, V15.7.0.

Enhancement 1:
1>else if an SCell Activation/Deactivation MAC CE is received deactivating the SCell; or
1>if the sCellDeactivationTimer associated with the activated SCell expires:
  2>deactivate the SCell according to the timing defined in TS 38.213 [6];
  2>stop the sCellDeactivationTimer associated with the SCell;
  2>stop the bwp-InactivityTimer associated with the SCell;
  2>deactivate any active BWP associated with the SCell;
  2>clear any configured downlink assignment and any configured uplink grant Type 2 associated with the SCell respectively;
  2>clear any PUSCH resource for semi-persistent CSI reporting associated with the SCell;
  2>suspend any configured uplink grant Type 1 associated with the SCell;
  2>flush all HARQ buffers associated with the SCell;
ADDITIONAL LIST ITEM:
  2>stop transmitting Scheduling requests associated with beam failure recovery associated with the SCell.

In Enhancement 2, an additional list item is added to the list of acts in accordance with some embodiments of the present disclosure. The additional list item of Enhancement 2 corresponds to an act of stopping transmission of a BFR MAC CE if the BFR MAC CE reports beam failure of only a SCell, such as a deactivated SCell (e.g., the transmission of the BFR MAC CE may be stopped if the BFR MAC CE does not report beam failure of one or more cells other than the SCell). A modified version of the portion of Section 5.9 of 3GPP TS 38.321, V15.7.0, containing the additional list item of Enhancement 2, is provided below. The additional list item of Enhancement 2 is preceded by the term "ADDITIONAL LIST ITEM:" to distinguish the additional list item from other list items originally included in Section 5.9 of 3GPP TS 38.321, V15.7.0.

Enhancement 2:
1>else if an SCell Activation/Deactivation MAC CE is received deactivating the SCell; or
1>if the sCellDeactivationTimer associated with the activated SCell expires:
  2>deactivate the SCell according to the timing defined in TS 38.213 [6];
  2>stop the sCellDeactivationTimer associated with the SCell;
  2>stop the bwp-InactivityTimer associated with the SCell;
  2>deactivate any active BWP associated with the SCell;
  2>clear any configured downlink assignment and any configured uplink grant Type 2 associated with the SCell respectively;
  2>clear any PUSCH resource for semi-persistent CSI reporting associated with the SCell;
  2>suspend any configured uplink grant Type 1 associated with the SCell;
  2>flush all HARQ buffers associated with the SCell;
ADDITIONAL LIST ITEM:
  2>stop transmitting BFR MAC CE if the BFR MAC CE reports beam failure of only the SCell.

In Enhancement 3, an additional list item is added to the list of acts in accordance with some embodiments of the present disclosure. The additional list item of Enhancement 3 corresponds to an act of stopping transmission of a BFR MAC CE if SCells reported by the BFR MAC CE (e.g., one or more SCells for which beam failure is indicated by the BFR MAC CE) are all deactivated (e.g., the additional list item may correspond to an act of stopping transmission of a BFR MAC CE if all SCells reported by the BFR MAC CE are deactivated). A modified version of the portion of Section 5.9 of 3GPP TS 38.321, V15.7.0, containing the additional list item of Enhancement 3, is provided below. The additional list item of Enhancement 3 is preceded by the term "ADDITIONAL LIST ITEM:" to distinguish the additional list item from other list items originally included in Section 5.9 of 3GPP TS 38.321, V15.7.0.

Enhancement 3:
1>else if an SCell Activation/Deactivation MAC CE is received deactivating the SCell; or
1>if the sCellDeactivationTimer associated with the activated SCell expires:
  2>deactivate the SCell according to the timing defined in TS 38.213 [6];
  2>stop the sCellDeactivationTimer associated with the SCell;
  2>stop the bwp-InactivityTimer associated with the SCell;

2>deactivate any active BWP associated with the SCell;
2>clear any configured downlink assignment and any configured uplink grant Type 2 associated with the SCell respectively;
2>clear any PUSCH resource for semi-persistent CSI reporting associated with the SCell;
2>suspend any configured uplink grant Type 1 associated with the SCell;
2>flush all HARQ buffers associated with the SCell;
ADDITIONAL LIST ITEM:
2>stop transmitting BFR MAC CE if SCells reported by the BFR MAC CE are all deactivated.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 9-13. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 9-13, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling a UE to avoid unnecessarily performing operations of a BFR procedure when a cell (e.g., a SCell) associated with the BFR procedure is deactivated.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) configured with multiple cells comprising a first cell and a second cell, the method comprising:
triggering a first beam failure recovery (BFR) in response to a beam failure indication for the first cell;
responsive to the first triggered BFR, triggering a Scheduling Request (SR) for Secondary Cell (SCell) beam failure recovery;
performing SR transmission for SCell beam failure recovery on the second cell; and
responsive to deactivation of the first cell associated with the beam failure indication that triggered the first triggered BFR, canceling both (i) the first triggered BFR associated with the first cell and (ii) the triggered SR for SCell beam failure recovery associated with the first cell, wherein the first cell is an SCell of the UE and the second cell is a Primary Cell (PCell) of the UE.

2. The method of claim 1, comprising:
responsive to the deactivation of the first cell, stopping SR transmission for SCell beam failure recovery if the UE does not have a cell, other than the first cell, associated with a second triggered BFR.

3. The method of claim 1, comprising:
responsive to the deactivation of the first cell, not stopping SR transmission for SCell beam failure recovery if the UE has an activated cell, other than the first cell, associated with a second triggered BFR.

4. The method of claim 1, comprising:
prior to the canceling the first triggered BFR, generating a BFR Medium Access Control (MAC) Control Element (CE) if one or more Uplink Shared Channel (UL-SCH) resources, for accommodating the BFR MAC CE and a subheader of the BFR MAC CE, are available.

5. The method of claim 1, wherein:
the triggering the SR for SCell beam failure recovery is performed based upon the first triggered BFR not being canceled and based upon an unavailability of Uplink Shared Channel (UL-SCH) resources for accommodating a BFR Medium Access Control (MAC) Control Element (CE) and a subheader of the BFR MAC CE.

6. The method of claim 1, comprising:
responsive to the first triggered BFR, initiating a random access procedure on a Special Cell (SpCell); and
responsive to the deactivation of the first cell, stopping the random access procedure.

7. The method of claim 1, wherein:
the deactivation of the first cell is performed responsive to:
receiving a Medium Access Control (MAC) Control Element (CE), associated with SCell deactivation, from a base station; or
expiration of a SCell deactivation timer.

8. The method of claim 1, comprising:
determining to not trigger a second BFR associated with the second cell based upon the second cell being the PCell of the UE.

9. A User Equipment (UE) configured with multiple cells comprising a first cell and a second cell, the UE comprising:
a control circuit;
a processor installed in the control circuit; and
a memory installed in the control circuit and operatively coupled to the processor, wherein the processor is configured to execute a program code stored in the memory to perform operations, the operations comprising:
triggering a first beam failure recovery (BFR) in response to a beam failure indication for the first cell;
responsive to the first triggered BFR, triggering a Scheduling Request (SR) for Secondary Cell (SCell) beam failure recovery;
performing SR transmission for SCell beam failure recovery on the second cell; and
responsive to deactivation of the first cell associated with the beam failure indication that triggered the first triggered BFR, canceling both (i) the first triggered BFR associated with the first cell and (ii) the triggered SR for SCell beam failure recovery associated with the first cell, wherein the first cell is an SCell of the UE and the second cell is a Primary Cell (PCell) of the UE.

10. The UE of claim 9, the operations comprising:
responsive to the deactivation of the first cell, stopping SR transmission for SCell beam failure recovery if the UE does not have a cell, other than the first cell, associated with a second triggered BFR.

11. The UE of claim 9, the operations comprising:
responsive to the deactivation of the first cell, not stopping SR transmission for SCell beam failure recovery if the UE has an activated cell, other than the first cell, associated with a second triggered BFR.

12. The UE of claim 9, the operations comprising:
prior to the canceling the first triggered BFR, generating a BFR Medium Access Control (MAC) Control Element (CE) if one or more Uplink Shared Channel (UL-SCH) resources, for accommodating the BFR MAC CE and a subheader of the BFR MAC CE, are available.

13. The UE of claim 9, wherein:
the triggering the SR for SCell beam failure recovery is performed based upon the first triggered BFR not being canceled and based upon an unavailability of Uplink Shared Channel (UL-SCH) resources for accommodating a BFR Medium Access Control (MAC) Control Element (CE) and a subheader of the BFR MAC CE.

14. The UE of claim 9, the operations comprising:
responsive to the first triggered BFR, initiating a random access procedure on a Special Cell (SpCell); and
responsive to the deactivation of the first cell, stopping the random access procedure.

15. The UE of claim 9, wherein:
the deactivation of the first cell is performed responsive to:
receiving a Medium Access Control (MAC) Control Element (CE), associated with SCell deactivation, from a base station; or
expiration of a SCell deactivation timer.

16. The UE of claim 9, the operations comprising:
determining to not trigger a second BFR associated with the second cell based upon the second cell being the PCell of the UE.

17. A non-transitory computer-readable medium comprising processor-executable instructions that, when executed by a User Equipment (UE) configured with multiple cells comprising a first cell and a second cell, cause performance of operations, the operations comprising:
- triggering a first beam failure recovery (BFR) in response to a beam failure indication for the first cell;
- responsive to the first triggered BFR, triggering a Scheduling Request (SR) for Secondary Cell (SCell) beam failure recovery; and
- responsive to deactivation of the first cell associated with the beam failure indication that triggered the first triggered BFR, canceling the first triggered BFR associated with the first cell and one of:
  - stopping SR transmission for SCell beam failure recovery if the UE does not have an activated cell associated with a second triggered BFR; or
  - not stopping the SR transmission for SCell beam failure recovery if the UE has an activated cell associated with the second triggered BFR, wherein the SR transmission for SCell beam failure recovery is performed on the second cell, wherein one of the first cell or the second cell is an SCell of the UE and another of the first cell or the second cell is a Primary Cell (PCell) of the UE.

18. The non-transitory computer-readable medium of claim 17, wherein:
the deactivation of the first cell is performed responsive to:
- receiving a Medium Access Control (MAC) Control Element (CE), associated with SCell deactivation, from a base station; or
- expiration of a SCell deactivation timer.

19. The method of claim 1, wherein:
the performing SR transmission for SCell beam failure recovery on the second cell is performed responsive to:
- the triggered SR for SCell beam failure recovery triggered responsive to the first triggered BFR associated with the first cell.

20. The UE of claim 9, wherein:
the performing SR transmission for SCell beam failure recovery on the second cell is performed responsive to:
- the triggered SR for SCell beam failure recovery triggered responsive to the first triggered BFR associated with the first cell.

* * * * *